United States Patent
Cok

(10) Patent No.: US 8,713,269 B2
(45) Date of Patent: Apr. 29, 2014

(54) DISTRIBUTED IMAGE ACQUISITION, STORAGE, AND BACKUP SYSTEM

(75) Inventor: Ronald Steven Cok, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 209 days.

(21) Appl. No.: 13/182,721

(22) Filed: Jul. 14, 2011

(65) Prior Publication Data

US 2013/0019073 A1     Jan. 17, 2013

(51) Int. Cl.
*G06F 12/02* (2006.01)
*G06F 12/16* (2006.01)

(52) U.S. Cl.
USPC .................................. 711/162; 711/E12.103

(58) Field of Classification Search
USPC .......................................... 711/162, E12.103
See application file for complete search history.

(56) References Cited

U.S. PATENT DOCUMENTS

| | | | |
|---|---|---|---|
| 388,850 A | 9/1888 | Eastman | |
| 6,678,737 B1 | 1/2004 | Bucher | |
| 6,928,476 B2 | 8/2005 | Bucher | |
| 7,024,051 B2 | 4/2006 | Miller | |
| 7,271,780 B2 | 9/2007 | Cok | |
| 7,555,527 B1* | 6/2009 | Slaughter et al. | 709/213 |
| 7,675,554 B2 | 3/2010 | Belz et al. | |
| 7,701,490 B2 | 4/2010 | Ward et al. | |
| 7,724,285 B2 | 5/2010 | Belz et al. | |
| 7,742,084 B2 | 6/2010 | Ward et al. | |
| 7,764,290 B2 | 7/2010 | Fredlund et al. | |
| 7,849,199 B2 | 12/2010 | Schulz et al. | |
| 2002/0114341 A1* | 8/2002 | Sutherland et al. | 370/428 |
| 2004/0162900 A1 | 8/2004 | Bucher et al. | |
| 2005/0052548 A1* | 3/2005 | Delaney | 348/231.2 |
| 2005/0060700 A1 | 3/2005 | Bucher et al. | |
| 2005/0125484 A1 | 6/2005 | Bucher et al. | |
| 2005/0168580 A1* | 8/2005 | Fukushima et al. | 348/207.99 |
| 2005/0177869 A1 | 8/2005 | Savage et al. | |
| 2006/0026171 A1 | 2/2006 | Savage | |
| 2008/0147821 A1* | 6/2008 | Dietrich et al. | 709/216 |
| 2009/0089521 A1* | 4/2009 | Madison et al. | 711/162 |
| 2010/0274983 A1* | 10/2010 | Murphy et al. | 711/162 |

* cited by examiner

*Primary Examiner* — Hal Schnee

(57) ABSTRACT

A distributed image acquisition, storage, and backup system includes a digital camera and a plurality of functionally identical independent storage devices storing digital images. Each digital image is stored as a working copy and a corresponding backup copy on a storage device different from the storage device storing the working copy. One or more storage devices store both a working copy of a first digital image and a backup copy of a second digital image different from the first digital image. Each storage device automatically sends a working copy or backup copy to another of the plurality of storage devices, automatically receives a working copy or backup copy from another of the plurality of storage devices, and automatically stores a received working copy or backup copy.

26 Claims, 19 Drawing Sheets

SRA Data

SR List
SRB address
SRC address
SRD address

Camera List
CamA address
CamB address
CamC address

Local Storage
Total Storage
Used Storage

Local Images
Image A, File Structure, Local Name
Image B, File Structure, Local Name
Image C, File Structure, Local Name
Image D, File Structure, Local Name Remote Backup for Local Images
Backup A address
Backup B address
Backup C address
Backup D address Local Backup for Remote Images
Backup X, address, File Structure, Local Name
Backup Y, address, File Structure, Local Name
Backup Z, address, File Structure, Local Name SRID, SRIDa, SRIDb Variables
MyID = SRA address

DISTRIBUTED IMAGE ACQUISITION, STORAGE, AND BACKUP SYSTEM

CROSS REFERENCE TO RELATED APPLICATIONS

Reference is made to commonly assigned U.S. patent application Ser. No. 13/042,501 filed Mar. 8, 2011, entitled "Distributed Image Acquisition, Storage, and Backup Method" by Ronald S. Cok et al; U.S. patent application Ser. No. 13/042,503 filed Mar. 8, 2011, entitled "Distributed Image Acquisition, Communication and Storage System", by Ronald S. Cok; U.S. patent application Ser. No. 13/047,982, filed Mar. 15, 2011, entitled "Distribution Storage and Metadata System" by Ronald S. Cok et al, and U.S. patent application Ser. No. 13/182,743 filed concurrently herewith, entitled "Distributed Image Acquisition, Storage, and Backup Method", by Ronald S. Cok, the disclosure of which is incorporated herein.

FIELD OF THE INVENTION

The present invention relates to digital image acquisition and storage systems and, in particular, to distributed storage systems providing backup.

BACKGROUND OF THE INVENTION

Since the inception of consumer photography, over 120 years ago, numerous innovations have been developed to ease the costs and complexities of taking, viewing, and sharing photographs. The original invention of flexible roll film provided the ability to record multiple, sequential, photographs without glass plates, chemicals, and reloading cameras. This innovation combined with the simple, inexpensive, and easy to use "box camera" (U.S. Pat. No. 388,850) and centralized photo processing made picture taking more affordable and accessible. Innovations such as easy-to-load film cartridges, motorized film advance, automatic exposure, electronic flash, automatic focus, one-time use cameras, compact cameras, and zoom lenses were all directed at reducing the burden of photography. In addition, the development of integrated photo-processing equipment or "mini-labs" and "photo kiosks" made photo-processing and printing in retail environments feasible.

More recently, the development of digital cameras has provided significant benefits. Digital cameras are a common and widely used consumer electronics product invented at the Eastman Kodak Company and used by many people to record images and events in their lives. However, such cameras have also placed new burdens on consumer photographers. The conventional process for acquiring and managing digital images is cumbersome. Digital cameras with complex control mechanisms and modes are used to acquire images. Digital images are typically captured with an electronic sensor integrated circuit in response to a user-operated control and stored in a memory in the digital camera. After some period of time, the camera is plugged into a computer through a wired interface such as a Universal Serial Bus (USB) connector and downloaded through an interface to a computer. Wireless information transfer systems employing WiFi protocols and hardware over local area networks and point-to-point wireless transfers such as Bluetooth® are also known. The computer executes an image-transfer program to transfer digital images from the camera to a storage device controlled by the computer, for example rotating magnetic media such as a disk. A complex software program can then be used to manipulate, store, print, or otherwise employ the digital images. The images can be viewed, manipulated, printed, and permanently stored on the computer or with an on-line service over the Internet.

Although digital cameras eliminate the costs and complexity of film usage and processing, the user of digital photography systems must overcome a wide variety of problems. Various incompatible file formats, numerous incompatible memory card formats, image file transfer, image file storage and access, on-line image file storage, incompatible computer devices with incompatible software and interfaces, computer-centric software, and post-capture operations have all added to the complexity and costs of photography. Organization, storage, and redundant backup of personal photo collections, sometimes including many thousands of digital images and video clips, become the responsibility of the photographer. Simple photo albums, shoeboxes, and slide trays that were once the final repository of irreplaceable images were directly viewable and readily understood and used. Photographic prints, slides, and negatives are today replaced by digital-media collections. These digital-media collections are often scattered across the hard drives of several different computers, on various types of digital storage devices such as removable hard drives, optical disks, Photo CDs, CDs, DVDs, and memory cards.

On-line storage accounts provide a new method to aggregate digital media collections and assure redundant back up, but these systems require the user to periodically upload their newly acquired digital images to the on-line storage account and are subject to the rules, limitations, and fees established by the on-line storage provider. Automatic backup to on-line storage accounts can be limited to single computers with an established identity and network address.

Many digital cameras require the interactive use of a computer to transfer images from the camera to a secondary storage device or system. In addition, file formats and storage devices become obsolete as new digital cameras and computers become available. All of these problems interfere with the simple pleasure of taking and using photographs. In particular, digital photography practitioners must accommodate a variety of computers and computing devices, complex, non-standard user interfaces, complex workflows, image-storage management, security challenges, and incompatible image storage formats.

The use of computer networks with a variety of connected electronic devices, including storage devices is known, for example as disclosed in U.S. Pat. No. 6,928,476 and U.S. Patent Application Publication 20050060700. U.S. Pat. No. 6,678,737 describes data management units on computer networks with associated display devices. Content management systems and networks are described in U.S. Patent Application Publication 20060026171, U.S. Patent Application Publication 20050177869, in U.S. Patent Application Publication 20050125484, and in U.S. Patent Application Publication 20040162900. Systems for storing, sharing, and displaying digital images in a common collection, including images obtained from digital cameras are known, for example as taught in U.S. Pat. Nos. 7,024,051, 7,724,285 and 7,675,554. However, none of these systems provide a simple, low cost, and straightforward system or method for interacting with, managing, storing, and controlling digital images in a distributed consumer environment.

The use of WiFi wireless connectivity for communication between a camera and a computer is known. Likewise, wireless computer networks are known, as are various computer peripheral devices that interact with each other and the computer wirelessly through the computer network. Wireless data storage devices that wirelessly interact with a computer are also known. However, such networks do not overcome the challenges of prior-art digital imaging systems, particularly in a distributed system with remote locations. U.S. Pat. Nos. 7,742,084 and 7,701,490 describe transferring images from a digital camera to desired locations through a wireless network. U.S. Pat. No. 7,849,199 describes a system for routing changes to information between a plurality of content nodes such as mobile telephones and email accounts. Storage systems available on a network are also known and commercially available. Since many consumers eventually create image collections of thousands or tens of thousands of images, a large amount of storage can be needed.

Because digital cameras have limited memory sizes, acquired images must be frequently transferred to a computer or other storage device. Furthermore, because a user's computer is generally at a single location although the digital cameras are mobile, it can be inconvenient to transfer images stored in a digital camera to a computer. Thus, the usefulness of the digital camera can be limited, particularly when a user is traveling.

Users are also concerned with the security of their stored digital images. Since personal images frequently have great emotional significance to users, ensuring the survival of the digital images in case of calamity, for example a hard disk crash or a household fire or flood, is important to users. Such security is typically provided with storage backup systems operated by the computer or with on-line storage. If stored on a single memory system that fails, the images can be permanently lost. To avoid such a loss, backup systems such as RAID devices and on-line storage services are available. Despite this need, typical users do not employ backup support for their personal digital images, largely because of the complexity of such systems. Managing RAID systems can be complicated and inefficient and on-line storage services can be expensive and slow, since image collections can be transferred at slow transfer rates to the on-line service. Moreover, RAID systems can be difficult to incrementally enlarge, inflexible, can require central controllers, and are not directly accessible over a distributed network. U.S. Pat. Nos. 7,764, 290 and 7,271,780 address the issue of an archival storage system with an external memory system for use with an imaging system. However, further improvements and simplifications can be made, particularly for remote access.

In general, users find the interactive use of computers for receiving, storing, viewing, and using their images to be complicated, tedious, and expensive, with many barriers to access, particularly for mobile digital cameras. There is a need therefore, for an improved system and method for capturing, transferring, and storing digital images in a digital storage system.

SUMMARY OF THE INVENTION

In accordance with the present invention, there is provided a distributed image acquisition, storage, and backup system, comprising:

a digital camera that acquires digital images and transmits digital images;

a plurality of functionally identical independent storage devices, each storage device receiving digital images from the digital camera and storing digital images, wherein each digital image is stored as a working copy on a storage device and is stored as a corresponding backup copy on a storage device different from the storage device storing the working copy, and one or more storage devices storing both a working copy of a first digital image and a backup copy of a second digital image different from the first digital image;

each storage device automatically sending a working copy or backup copy to another of the plurality of storage devices, automatically receiving a working copy or backup copy from another of the plurality of storage devices, and automatically storing a received working copy or backup copy;

means for causing the digital camera to transmit a digital image to a first storage device;

means for storing the transmitted digital image as a working copy in the first storage device and a backup copy of the working copy in a second storage device different from the first storage device; and means for storing a working copy of the transmitted digital image in a second storage device different from the first storage device and a backup copy of the working copy in a storage device different from the second storage device.

The present invention provides improved convenience, storage, and simplicity for users of digital image cameras. Communication between digital cameras and storage devices are enabled with security and simplicity in a highly distributed environment that provides mobility, storage, convenience, and security to digital camera users. Image data backup redundancy and restoration is provided invisibly to the users in a system that can be incrementally enlarged.

BRIEF DESCRIPTION OF THE DRAWINGS

The above and other features and advantages of the present invention will become more apparent when taken in conjunction with the following description and drawings, wherein identical reference numerals have been used, where appropriate, to designate identical features that are common to the figures, and wherein:

FIG. 2 is an illustration of a data distributed on functionally identical storage devices according to an embodiment of the present invention;

FIG. 14 is a data list for an exemplary storage device according to an embodiment of the present invention;

DETAILED DESCRIPTION OF THE INVENTION

Figure 1A:
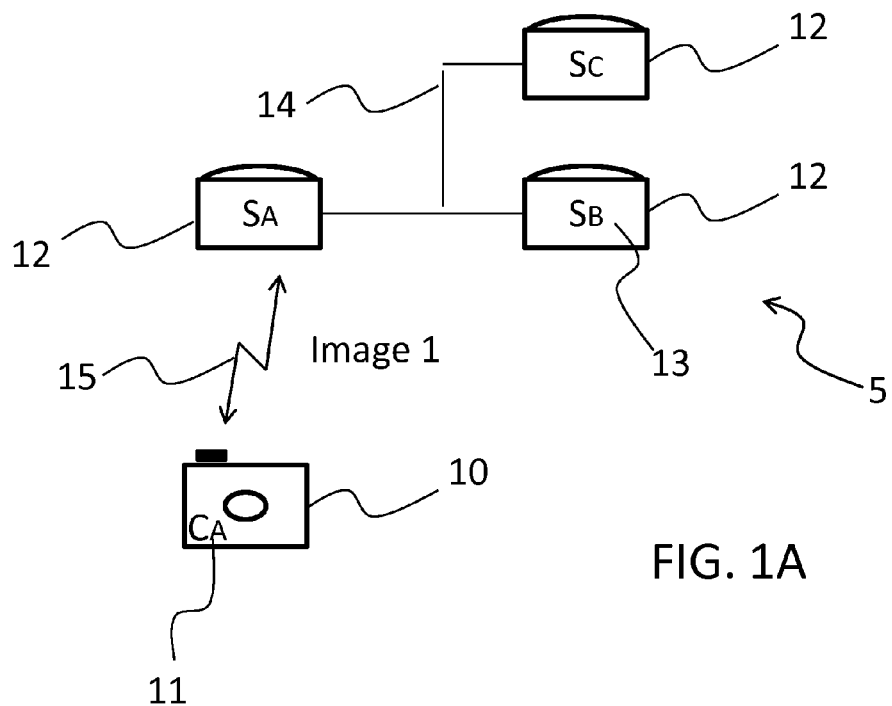
FIG. 1A is an illustration of a digital image system including a digital camera with a wireless local communication channel and network-distributed functionally identical storage devices according to an embodiment of the present invention.

Referring to FIG. 1A, a distributed image acquisition, storage, and backup system 5 includes a digital camera 10 that acquires digital images and transmits digital images and includes a plurality of functionally identical independent storage devices 12. The digital camera 10 can include a camera identifier 11. Each storage device 12 can receive digital images from the digital camera 10 and can store received digital images. Each digital image is stored as a working copy on the storage device 12 and a backup copy on a different storage device 12 and one or more storage devices 12 includes both a working copy of a first digital image and a backup copy of a second digital image different from the first digital image.

Functionally identical independent storage devices 12 can operate independently of each other and intercommunicate with each other using the same functions and interactions. Functionally identical independent storage devices 12 can differ in physical structure, storage capacity, bandwidth, and other attributes, but perform the same access, retrieval, and storage functions and are mutually interchangeable. The storage devices 12 can include a storage device identifier 13.

Functionally identical independent storage devices 12 can be interconnected on a network 14, either wired 16 or wireless 15, and can be distributed within a local network, e.g. a home network, or remotely, e.g. over the internet, and in different locations. The storage devices 12 can be network accessible, but do not necessarily include a display or other user-interactive interface. The storage devices 12 can be independently accessible and can each exchange information and receive images from digital cameras 10, for example through a wired or wireless network communication connection or through a point-to-point wired or wireless communication connection.

The functionally identical storage devices 12 are interoperable with other storage devices 12 and the digital camera 10 without the use of a central controlling device or central communication interface, unlike other commercially available backup storage systems. The storage devices 12 can, for example incorporate solid-state memories or rotating hard disks, to store digital images, together with controllers, such as embedded processors, to control and manage the digital images with firmware. The storage devices 10 include a way of storing transmitted digital images as working copies and as backup copies, for example by employing software or firmware embedded in a device controller. The storage devices 12 can include the unique storage device identifier 13 to identify the storage device 12. The storage devices 12 can include communication circuits to communicate with other storage devices 12 or with digital cameras 10. Such memory storage devices, firmware tools for enabling the present invention, and communication and control circuits are known in the art.

The digital camera 10 can include an image sensor for acquiring digital images. For example, the term digital camera includes image-capture devices such as cell phones with cameras, mobile phones including image-capture devices, independent digital cameras, and embedded digital cameras. The digital camera 10 can include a camera communication circuit, either wireless or wired, for receiving and transmitting information and digital images to and from storage devices 12, a user interface, and a digital-camera controller for controlling the image sensor, the camera wireless communication circuit, and the user interface. The user interface can include an image display and control switches. The digital camera 10 can include a camera identifier 11 that can be electronically stored within the digital camera 10. Image sensors, digital camera controller, wireless camera communication circuits, displays, switches, and touch screens employed in user interfaces are all known in the electronic and computing arts. As used herein, digital images refers to still images, image sequences, video sequences, groups of images, or any multi-media element that includes images. Digital cameras capable of communicating digital images and identifier 11 to storage devices 12 are known in the art, as are storage devices 12 capable of receiving digital images and camera identifier 11.

Each digital image, for example received from the digital camera 10, is stored as a working copy on the storage device 12 and is stored as a corresponding backup copy on the storage device 12 different from the storage device 12 storing the working copy. One or more storage devices 12 include both a working copy of a first digital image and a backup copy of a second digital image different from the first digital image. For example, as illustrated in FIGS. 1A-1D and FIG. 2, storage devices 12 identified as $S_A$, $S_B$, and $S_C$ can store digital images 1-10 as working copies $W_1$, $W_2$, $W_3$, $W_4$, $W_5$, $W_6$, $W_7$, $W_8$, $W_9$, and $W_{10}$ respectively, and corresponding backup copies $B_1$, $B_2$, $B_3$, $B_4$, $B_5$, $B_6$, $B_7$, $B_8$, $B_9$, and $B_{10}$. Storage device 12 $S_A$ stores working copies W1, W2, W3, and W7, and backup copies B4, B5, B6, and B8. Storage device 12 $S_B$ stores working copies W4, W5, W6, and W10, and backup copies B1, B2, B3, and B9. Storage device 12 $S_C$ stores working copies W8 and W9, and backup copies B7 and B10. Thus, no storage device 12 stores the backup copy corresponding to a working copy. The storage device 12 (actually all three storage devices 12 in the example of FIG. 2) store a working copy of one digital image and the backup copy of a different digital image. Thus, in the case of a failure of a single storage device 12, the working copies of the failed storage device 12 can be recovered from the corresponding backup copy on a different storage device 12 and the backup copies of the failed storage device 12 can be reconstituted from the corresponding working copy on a different storage device 12.

No storage device 12 is a mirror copy of another, unlike many RAID configurations. Furthermore, as illustrated in the FIGS. 1A-1D and FIG. 2, an odd number of storage devices 12, for example three, can be employed and individual, single storage devices 12 can be added to the distributed image acquisition, storage, and backup system 5. The storage devices 12 can store unique combinations of working and backup digital image copies. The storage devices 12 can together form a single, logical storage repository for digital images, for example a single addressable location and storage space. Network-connected storage devices of various sizes are known in the art, as are communication protocols enabling network interaction and communication with devices, both network and point-to-point.

Each storage device 12 can automatically send a working copy or a backup copy to another storage device 12, automatically receive a working copy or backup copy from another storage device 12, and automatically store a received working copy or backup copy. The digital camera 10 can transmit a digital image to a first storage device 12 and store the transmitted digital image as a working copy in the first storage device 12. The digital camera 10 can also transmit a digital image to a first storage device 12 and send a working copy of the transmitted digital image to a second storage device 12 different from the first storage device 12 and store the working copy of the transmitted digital image on the second storage device 12.

Each of the storage devices 12 can independently communicate with the digital camera 10 to receive or transmit digital images. Since a working copy of an image is not necessarily stored on the storage device 12 with which the digital camera is communicating at a given time, the storage devices 12 intercommunicate to transfer a working or backup copy to a suitable storage device 12. This enables a user of the digital camera 12 to connect his or her digital camera to any storage device 12 in the network to store a digital image without regard to the distribution of digital image working copies or backup copies in the network of storage devices 12. Similarly, a digital image can be retrieved from any storage device 12, regardless of the physical location of the digital image in the distributed network of storage devices 12.

Thus, the storage device 12 can request a working copy from another storage device 12 and the other storage device 12 can retrieve and transmit the working copy of a digital image to the digital camera 10 or to the requesting storage device 12. Similarly, the digital camera 10 can request and receive a working copy from the storage device 12. The storage device 12 can determine the absence of the working copy in the storage device 12 and request the working copy from another storage device 12, receive the requested working copy from the another storage device 12, and transmit the received working copy to the digital camera 10. This can all be done without user interaction or knowledge and enables the digital camera 10 to interact with any storage device 12 without regard to the physical location or distribution of digital image information in the digital storage devices 12.

According to an embodiment of the present invention, a backup copy can be stored in a different format than the corresponding working copy. For example, the backup copy can be more highly compressed since it is typically used only when the working copy is lost or otherwise unavailable. Moreover, a backup copy can be less accessible than the corresponding working copy, so that obtaining a working copy is faster than obtaining the corresponding backup copy.

In accordance with an embodiment of the present invention, each storage device 12 of the distributed image acquisition, storage, and backup system 5 is on the common local network 14 and stores information about other storage devices 12 on the common local network 14 or stores information about the working or backup copies stored on other storage devices 12 on the common local network 14, or both. Thus, each storage device 12 has information describing the contents of the other storage devices 12 and can communicate directly with the other storage device 12 having a digital image that the storage device 12 does not have. All of the storage devices 12 thus maintain essentially the same list of storage devices 12 and contents.

In an alternative embodiment, each storage device 12 is on the common local network 14 and does not include information about all of the other storage devices 12 on the common local network 14 or does not include information about all of the other working or backup copies stored on the other storage devices 12 on the common local network 14. In this case the different storage devices 12 do not maintain an essentially common list and requests for a digital image migrates through the network until the storage device 12 that has the desired digital image is found.

By locating the working copy or corresponding backup copy of a digital image, the digital image can be retrieved, for example by the digital camera 10 or by a user request from another network-connected computer. If a working copy or backup copy of a digital image is damaged on a single damaged storage device 12, the working copy or backup copy of the digital image can be reconstituted from the corresponding backup copy or working copy and stored on one or more other storage devices 12.

Storage devices 12 can be grouped, for example into groups belonging to different users. If the groups include digital storage devices having information about other groups, each user can transmit images from their own digital camera 10 through the digital storage device 12 belonging to another. Each group of storage devices 12 can form a separate, single logical storage repository separate from the single logical storage repository of any other storage group. In another embodiment, a storage device 12 can be shared between groups by defining a storage device 12 as belonging to the groups, for example by partitioning a disk on the storage device 12. This can be useful, for example, when different users are closely related, for example within a family, and it is desired to limit the number of storage devices 12 but also to provide independent control and access for the family users.

It is useful to provide the capability for load balancing the working copies and backup copies on the various storage devices 12 within a group. This increases the flexibility and performance of the system by ensuring that all of the storage devices 12 are accessible for storage at a given time. To enable this capability, a storage device 12 can transfer a working copy or backup copy from the storage device 12 to another storage device 12 and the other storage device 12 can receive and store the working copy or backup copy.

Storage devices 12 can make a working copy from a backup copy on the storage device 12 and transfer the working copy to another storage device 12 that includes a way to receive and store the working copy. Similarly, the storage device 12 can make a backup copy from a working copy on the storage device 12 and includes a way to transfer the backup copy to another storage device 12 that includes a way to receive and store the backup copy. This enables reconstitution of working copies and also enables load balancing. Alternatively, a storage device 12 can receive a duplicate of a working copy, make a backup copy of the duplicate, store the backup copy, and erase the duplicate, so that a backup copy is made in the storage device in which the backup copy is stored. Furthermore, in another embodiment, a backup copy is made in the digital camera 10 and transmitted to a storage device 12.

Figure 1B:
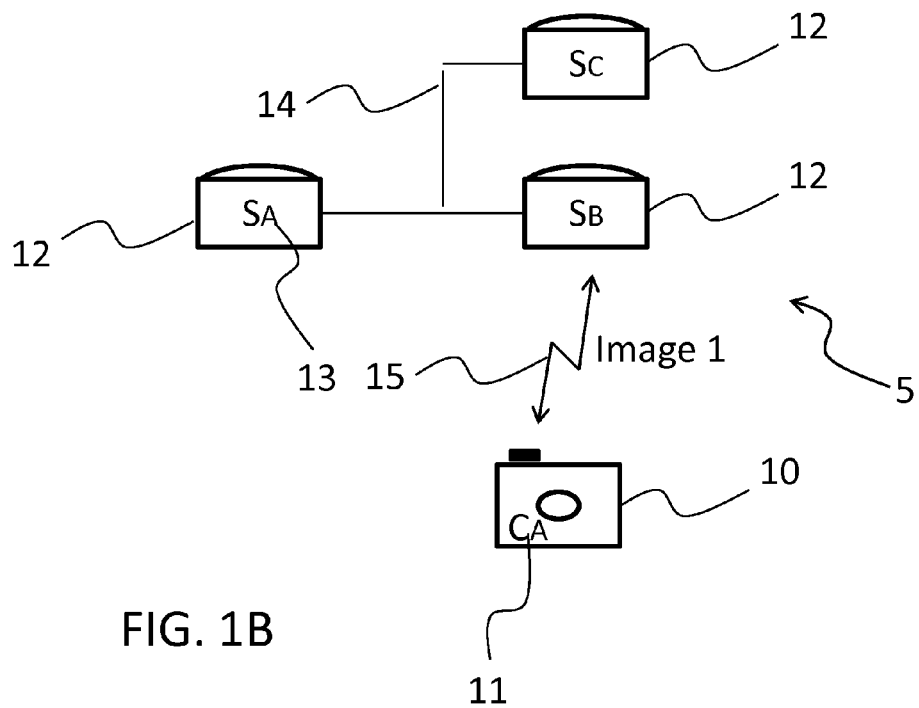
FIG. 1B is an illustration of a digital image system including a digital camera with a wireless local communication channel and network-distributed functionally identical storage devices according to an alternative embodiment of the present invention.

In an embodiment, the digital camera 10 can wirelessly transmit digital images and the storage device 12 can wirelessly receive digital images (as shown in FIGS. 1A and 1B). As shown in FIG. 1A and with reference to FIG. 2, digital image 1 transferred to storage device 12 $S_A$ is stored as a working copy in storage device 12 $S_A$. Alternatively, as suggested in FIG. 1B, a digital image transferred to storage device 12 $S_B$ is stored as a working copy in a different storage device 12 $S_A$. Communication between the digital camera 10 and storage devices 12 can be wired (FIGS. 1C and 1D), for example through an Ethernet connection or directly wired connection 16, or wireless, for example with WiFi or Bluetooth (FIGS. 1A and 1B) 15. The communication can be a network communication, for example a local area network 14, or a point-to-point connection. Since wired networks 16, wireless networks 15, local area networks 14 and remote computer-based communication networks can all be interconnected, the various networks referenced herein are not necessarily distinguished from one another.

Figure 1C:
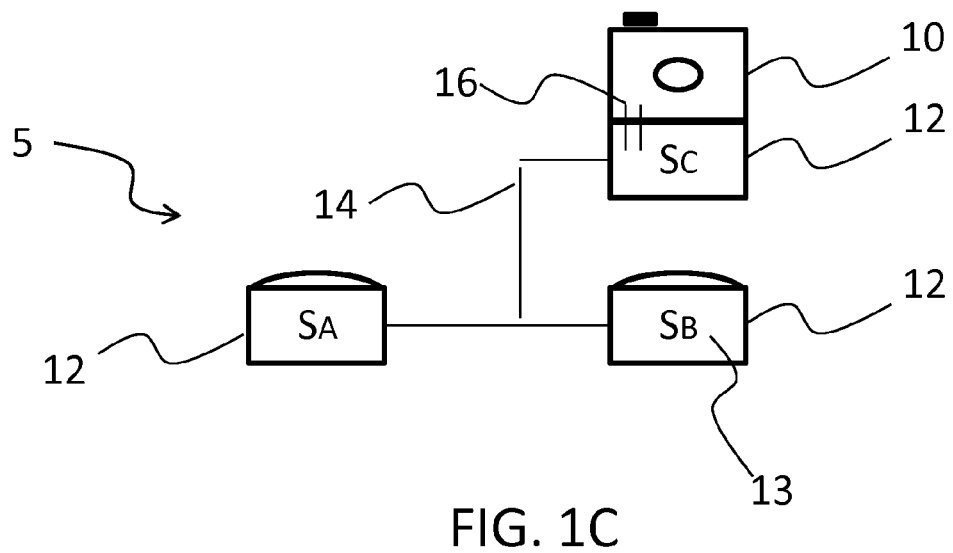
FIG. 1C is an illustration of a digital image system including a digital camera with a wired local communication channel in a dock and network-distributed functionally identical storage devices according to another embodiment of the present invention.
Figure 1D:
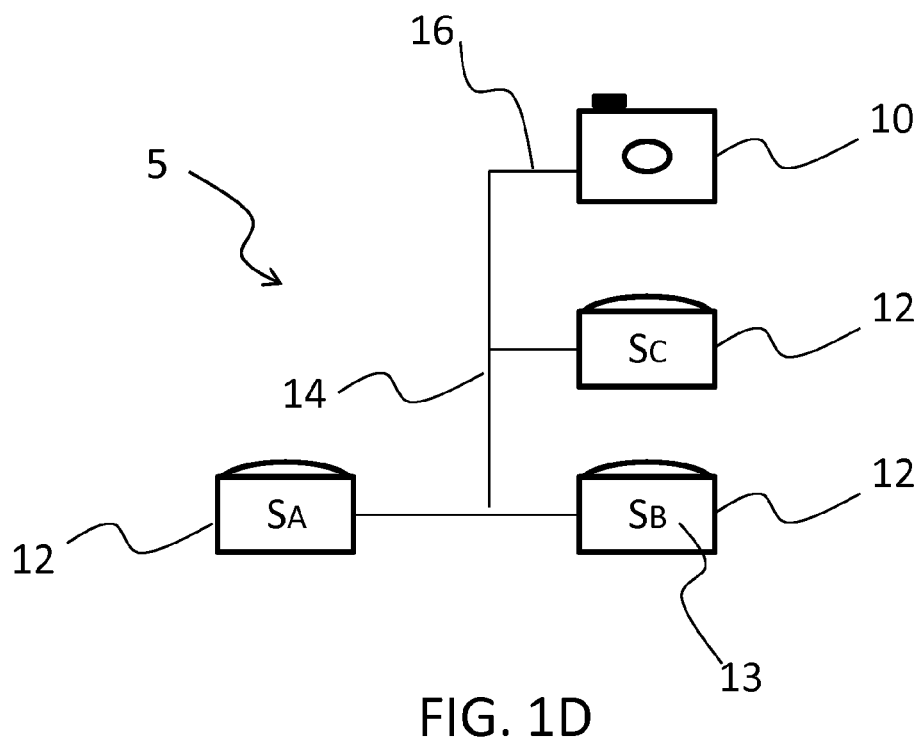
FIG. 1D is an illustration of a digital image system including a digital camera with a wired network communication channel and network-distributed functionally identical storage devices according to yet another embodiment of the present invention.

In another embodiment of the present invention, the digital camera 10 can be physically connected to the storage device 12 with a point-to-point connection, for example by integrating a camera dock with the storage device 12, as illustrated in FIG. 1C, to transmit digital images from the digital camera 10 to the storage device 12. Camera docks are known in the art, for example as sold by the Eastman Kodak Company.

As shown in FIG. 14 and as described further below, each storage device 12 can include a list of working copies stored in the storage device 12, a list of the storage devices 12 for each backup copy corresponding to each working copy, a list of backup copies stored in the storage device 12, and a list of the storage devices 12 for each of the corresponding working copies.

According to an embodiment of the present invention, a user interface in a digital camera 10 is operable to control digital images stored in the storage devices 12. By entering information through the digital camera user interface, a user can, for example, organize digital images, store digital images in storage devices 12, retrieve digital images from storage devices 12, and view digital images. Digital images can be named, renamed, moved from one location to another in a file hierarchy, transmitted, duplicated, and deleted. In an embodiment of the present invention, the user interface on the digital camera 10 remote from the storage device 12, can serve to control a digital-image storage software utility, e.g. a storage operating system, through communication circuits and camera and storage device controllers.

If one or more storage devices 12 are accessible to a computer network 14, other devices on the computer network 14 can likewise access the storage devices 12 to read, write, modify, or organize digital images. If the communication network 14 is connected to a remote communication network such as the internet, storage devices 12 can be provided with internet protocol addresses and suitable web-hosting software, or accessibility software in combination with other web sites, to provide access to the storage devices 12 over the internet. Thus, digital images can be controlled from external computers or can be controlled from digital cameras 10 that are connected to the internet but are not within range of a wireless connection to the storage device 12.

In embodiments of the present invention, the storage identifier 13 is used by the digital camera 10 to provide secure access to the storage device 12. The storage identifier 13 can be associated with the digital camera 10 in various ways. For example, in one embodiment the digital camera user interface is operable to manually enter the storage identifier 13. In this case, a digital camera user interacts with the user interface to enter the storage identifier 13 to the digital camera controller. The digital camera controller can then communicate the storage identifier 13 to the storage device 12 to demonstrate to the storage device 12 that the digital camera 10 has access privileges to the storage device 12. In another embodiment, the storage identifier 13 can be communicated wirelessly from the storage device 12 to the digital camera 10. If close proximity is needed to establish wireless communication, this can be adequate to provide security to the digital camera 10 or storage device 12 user. However, in other embodiments, it can be preferred to require a manual interaction to accept the wirelessly received storage identifier 13 so that other devices that are inadvertently within wireless communication range are not inappropriately connected or confused. In this case, a user can answer a question or take a specific action with the user interface to indicate the connection between the digital camera 10 and the storage device 20 (e.g. make a selection with a touch screen on a display). In one embodiment, physically docking the digital camera 10 on the storage device 12 can provide access privileges for storing transferred information (as shown in FIG. 1C). In another embodiment discussed further below, physically docking the digital camera 10 on the storage device 12 does not provide access privileges for storing transferred information. Storage device identifiers 13 or camera identifier 11 can be alphanumeric sequences or strings.

Once communicated to the digital camera 10, the storage identifier 13 can be stored in the digital camera 10 and used thereafter to communicate with the storage device 12, for example to use the storage device 12 as a repository for digital images acquired by the digital camera 10. If the storage device identifier 13 is not initially stored electronically in the storage device 12, it can be communicated to the storage device 12 and then stored. In many embodiments of the present invention, it is useful to maintain security for the digital camera 10, the storage device, 12 and any information stored in the storage device 12. Therefore, in some embodiments of the present invention, a security code can be employed. The storage device identifier 13 can be employed as a security code, if it is communicated securely. In other embodiments, the security code can be supplementary. The security code can originate from the storage device 12, the digital camera 10, or be chosen by a user, for example in a fashion similar to the use of passwords. If chosen by a user, the security code can be entered through the digital camera user interface by the user. As with the storage device identifier 13, a security code can be an alphanumeric sequence. In various embodiments, the security code is stored within the digital camera 10, the storage device 12, or both the digital camera 10 and the storage device 12, or is received from the storage device 12 and is stored within the digital camera 10. The security code can be entered each time a communication between the digital camera 10 and storage device 20 or can be automatically employed, once entered, for each communication, or some communications or actions can require that a security code be employed although other communications or actions do not.

In the cases in which multiple storage devices 12 or multiple cameras 10 are employed in an embodiment of a digital image system of the present invention, a common security code or the same storage device identifier 13 can be employed by the multiple digital cameras 10 or storage devices 12. In one embodiment of the present invention, control access to the digital images stored in the storage device 12 is provided equally from multiple digital cameras 10. In other embodiments, other digital cameras 10 can have restricted privileges with respect to the storage device 12. This latter embodiment, for example, can be useful if one digital camera 10 is operated by an adult and others are operated by children or those less skilled in managing digital-image collections.

In one method of the present invention, the digital camera 10 and the storage device 12 are purchased together. The digital camera 10 is purchased with the storage device 12, and both the digital camera 10 and the storage device 12 electronically store the same storage identifier 13 or related identifiers. Both the digital camera 10 and the storage device 12 are operable to encrypt and decrypt wireless communications with the storage identifier 13. The digital camera 10 and user interface are operable to provide additional instructions to the digital system to organize the storage device storage 12 as desired, for example for single or multiple users. Alternatively, external network access to the storage devices 12 can be provided for managing stored digital images.

Thereafter, when the digital camera 10 and the storage device 12 are in proximity or connected to a common wired or wireless network, the digital camera 10 can interact with the storage device 12 using secure communications to store and retrieve information such as digital images. If a common network is used, the user interface on the digital camera 10 can be employed to provide access codes to the network for the digital camera 10, the storage device 12, both the digital camera 10 and the storage device 12, or only one of the digital camera 10 and storage device 12. The storage device 12 can be connected to the communications network 14 although the digital camera 10 is not.

In another method of the present invention, the digital camera 10 and the storage device 12 are purchased separately. The storage device 12 electronically stores the storage identifier 13 and includes packaging material with the storage identifier 13 provided. The digital camera user interface is operated to enter the identifier into the digital camera 10. Both the digital camera 10 and the storage device 12 are operable to encrypt and decrypt communications with the storage identifier 13. The digital camera 10 interacts with the storage device 12 using the storage identifier 13 to establish a connection between the digital camera 10 and the storage device 12. The digital camera 10 and user interface 12 are operable to provide additional instructions to the digital system to organize the storage device 12 storage as desired, for example for single or multiple users. Thereafter, communications between the storage device 12 and the digital camera 10 can proceed as described above. Network access can be provided as described above.

If additional digital cameras 10 are desired to operate with the same storage device 12, the same process can be followed as described above, using the storage identifier 13. If an additional storage device 12 is desired, the additional storage identifier 13 can be provided to the digital camera 10 and communications established between the digital camera 10 and the additional storage device 12. In one embodiment of the present invention, the two storage devices 12 interoperate to organize the storage in the two storage devices 12 as a unified storage system, as desired, for example to provide backup, as a single extended storage space, to manage storage for multiple users, or to manage storage for multiple digital cameras 10. The storage space can also be organized to provide separate storage for each of multiple users. Each user can have a single logical storage space that can be distributed across multiple storage devices 12.

Digital cameras 10 are typically used as mobile devices to acquire images at various different locations. Although storage devices 12 are not necessarily similarly mobile, according to an embodiment of the present invention, storage devices 12 can be similarly mobile. In this embodiment, for example, a user can travel with both the digital camera 10 and the storage device 12 and periodically connect the digital camera 10 through a local communication connection 14 (a docking procedure) to transfer digital images from the digital camera 10 to the storage device 12.

In another embodiment, the digital camera 10 is mobile although the storage devices 12 are not necessarily mobile and are kept, for example at a user's home. In this situation, it is useful to be able to transfer digital images acquired by the digital camera 10 to the remote storage device 12. According to an embodiment of the present invention, this can be accomplished by enabling the digital camera 10 to communicate through a local communication channel to any storage device 12 that is connected to the remote communication network, even if the storage device 12 and the digital camera 10 are not associated with each other. By remote communication network it is meant a communication network 14 that is connected to two or more storage devices 12 and for which at least one of the storage devices 12 cannot be communicated with through a local communication channel with the digital camera 10, for example because it is not physically accessible or two far away (out of range). For example, a remote communication network such as the internet can interconnect two separate and different storage devices 12 in two different locations. Remotely connected storage devices 12 can have separate local communication channels that are not shared with a digital camera 10. Thus, the digital camera 10 that communicates through the local communication channel with one storage device 12 cannot communicate through the same local communication channel with another storage device 12 that is remotely connected through the remote communication network 14.

In this embodiment, each digital camera 10 has one or more associated storage devices 12 and one or more storage devices 12 that are not associated. The digital camera 10 can communicate locally using the communication network 14 to any storage device 12 with which it is associated, as described above. Additionally, the digital camera 10 can communicate locally with any storage device 12 with which it is not associated, for example by docking the digital camera 10 with the storage device 12 (FIG. 1C). When the digital camera 10 communicates locally with a non-associated storage device 12, information is transferred from the digital camera 10 to the non-associated storage device 12. However, security permissions can be different than for communication between associated devices, for example preventing editing, viewing, or managing images stored in the local non-associated storage device 12. The non-associated storage device 12 then forwards the received information to the storage device 12 associated with the digital camera 10 through a remote communication network (not shown). The associated storage device 12 receives the information through the remote communication network and stores the received information.

The storage devices 12 are functionally identical so that any storage device 12 can receive information from any digital camera 10. By functionally identical is meant that each storage device 12 can communicate with each digital camera 10 and forward information to any storage device 12, as needed. Functionally identical storage devices 12 can differ, for example by the amount of storage or speed of interaction or transmission, and by identification.

In various embodiments of the present invention, the remote communication network (not shown) can be the internet, the local communication channel is a wireless or wired local area network, or the local communication channel is a dock interface or a point-to-point wireless communication channel between a storage device 12 and a digital camera 10. As used herein, the network communication channel refers to either or both of the local communication channel 14 or remote communication channels (not shown) since they provide similar functional services. The system can include a plurality of functionally identical storage devices 12, each having a unique communication network address identifier, for example an internet protocol address or universal resource locater or universal resource indicator. Each storage device 12 can be associated with one or more digital cameras 10. Multiple storage devices 12 can be associated with a single digital camera 10, for example to expand the available storage space or to provide backup for stored information. Each of the digital cameras 10 can include a unique communication network address and can transmit the unique communication network address identifier with the digital images to the storage device 12. The functionally identical storage devices 12 can receive and store digital images from digital cameras 10 with which the storage device 12 is associated and can receive and transfer or forward digital images from digital cameras 10 with which the storage device 12 is not associated.

The flow diagrams of FIGS. 3-14 illustrate an operational embodiment of the present invention. The flow diagrams are descriptive in nature, not proscriptive, and serve to illustrate the concepts of the present invention. The flow diagrams are not a complete software design.

Figure 3:
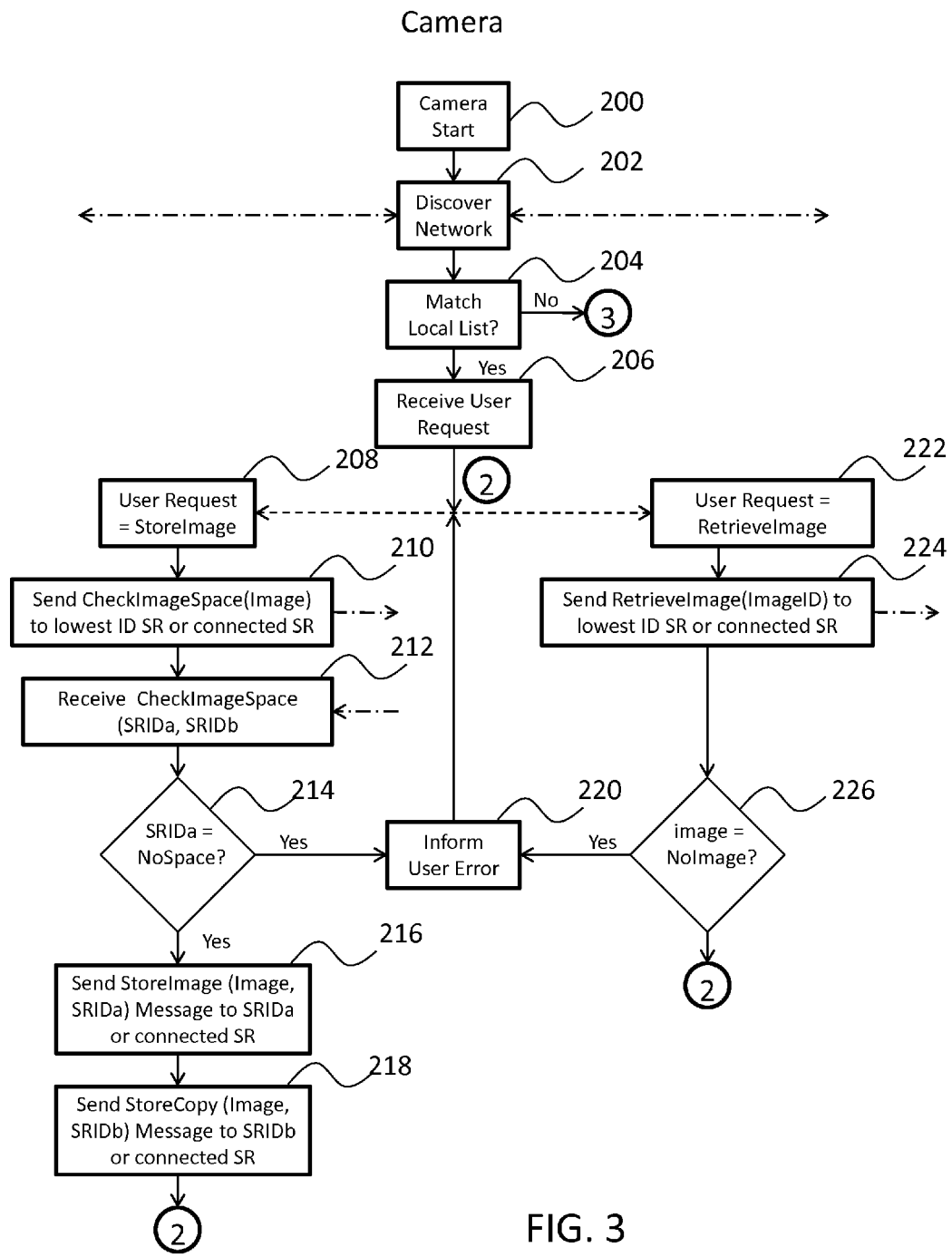
FIGS. 3-13 are flow-graphs illustrating an embodiment of the present invention.
Figure 4:
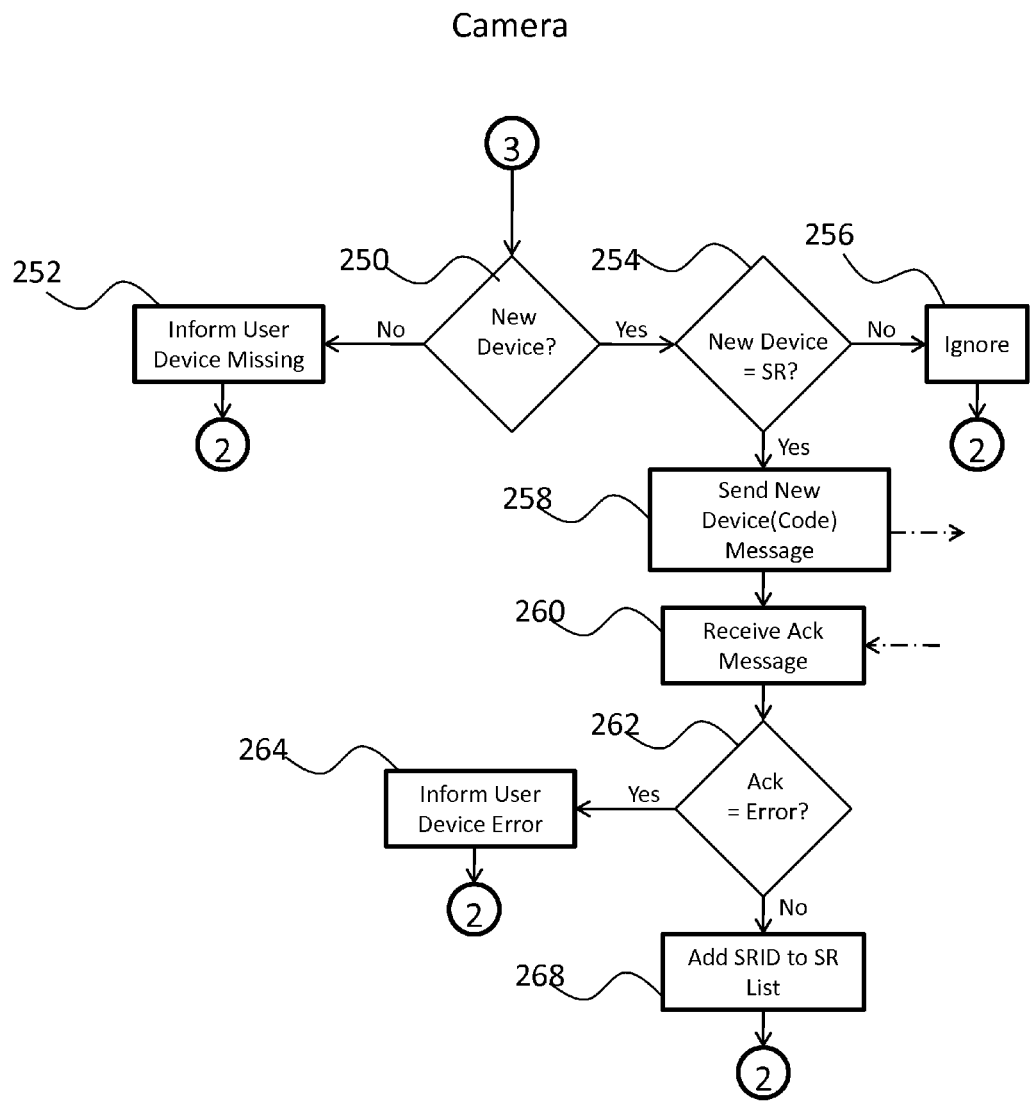
Figure 5:
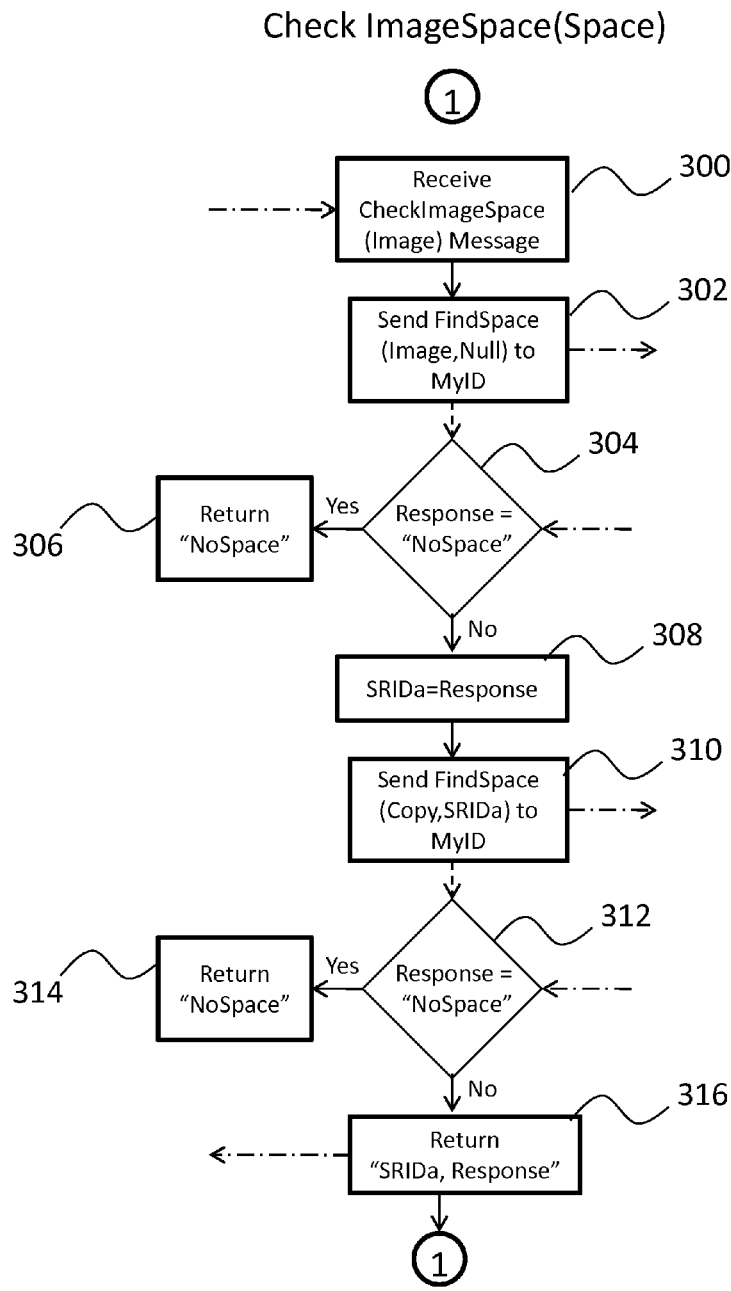
Figure 6:
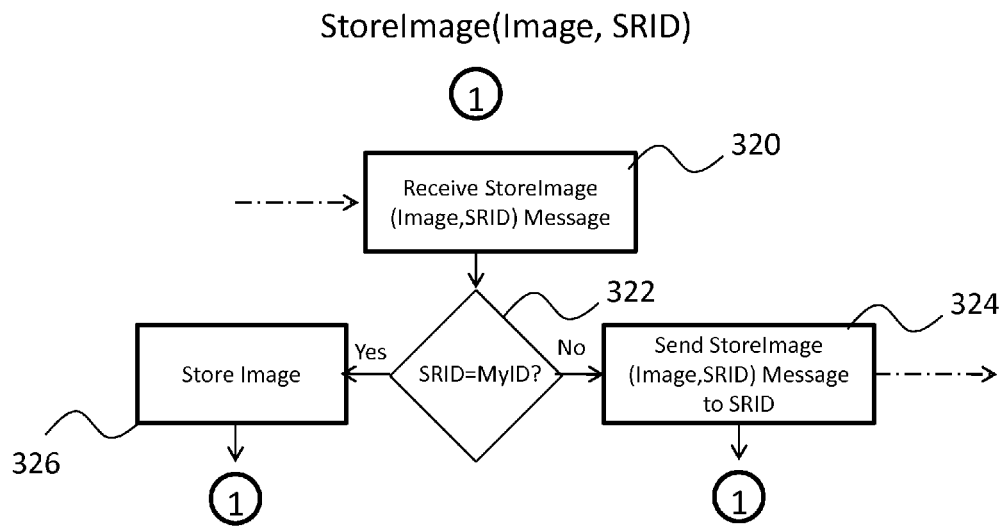
Figure 7:
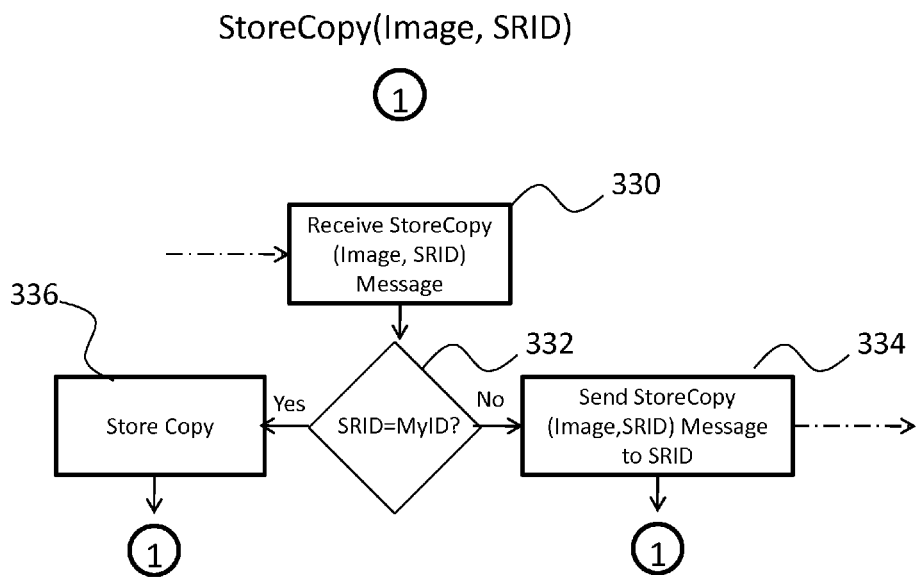
Figure 8:
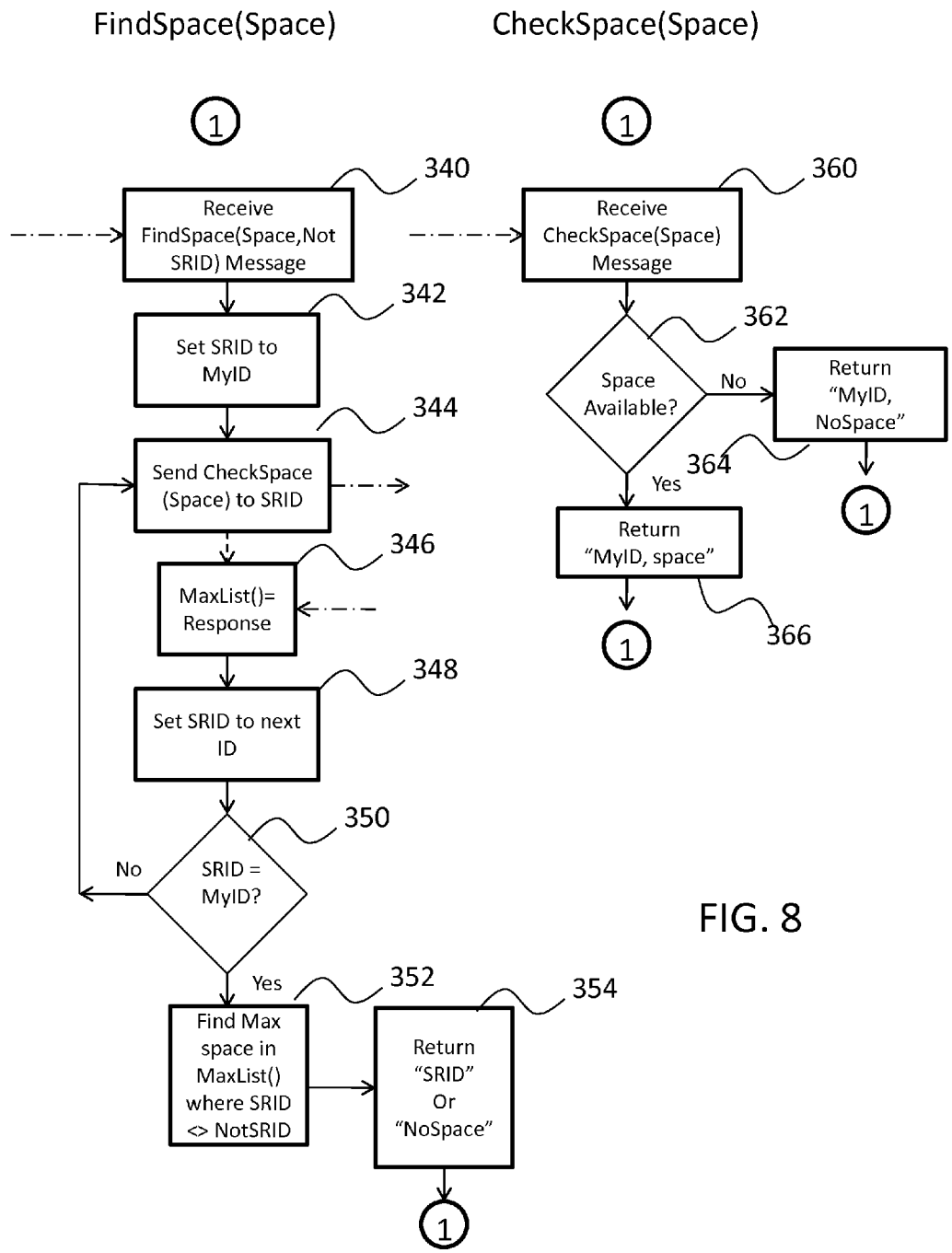
Figure 9:
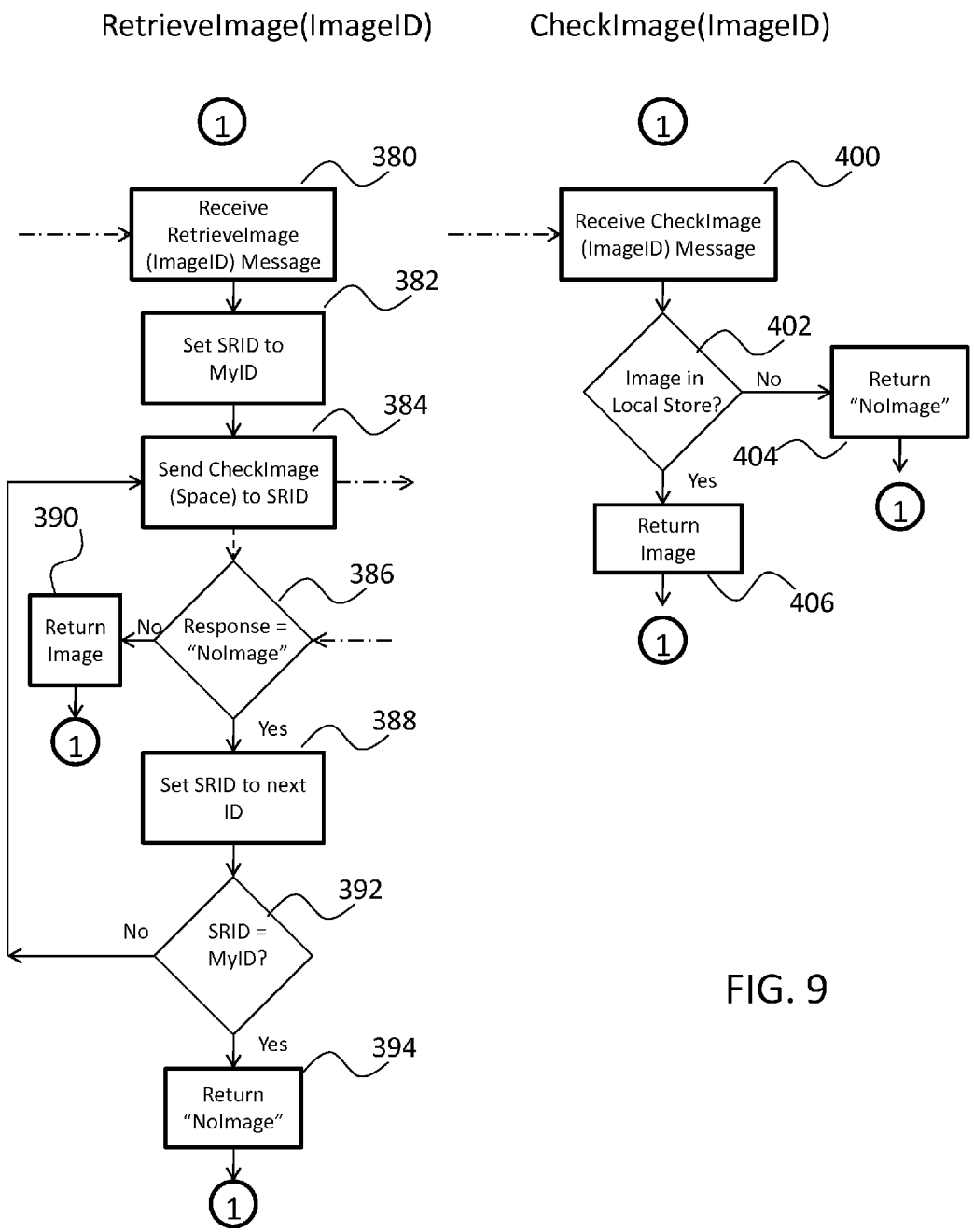
Figure 12:
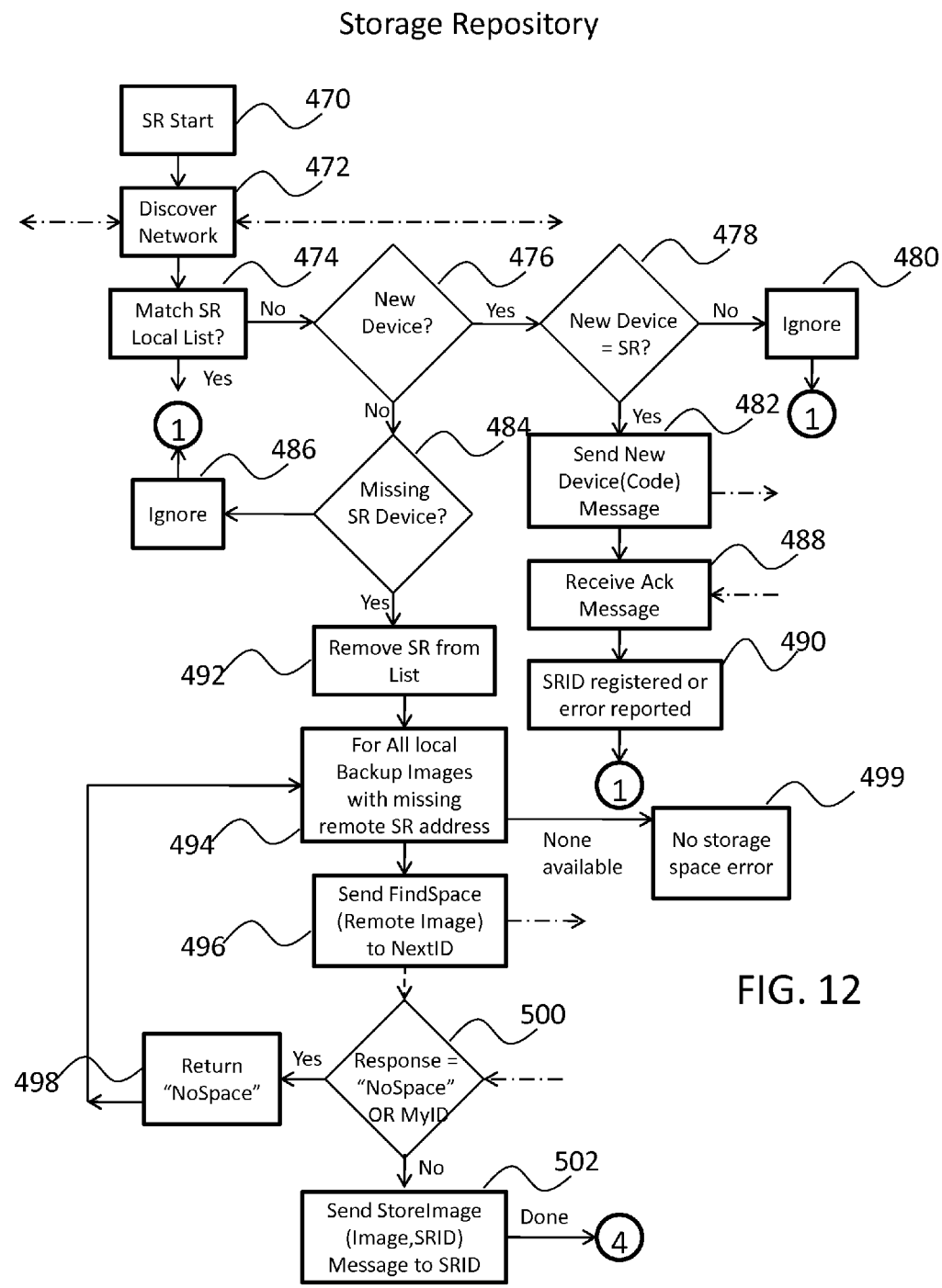
Figure 13:
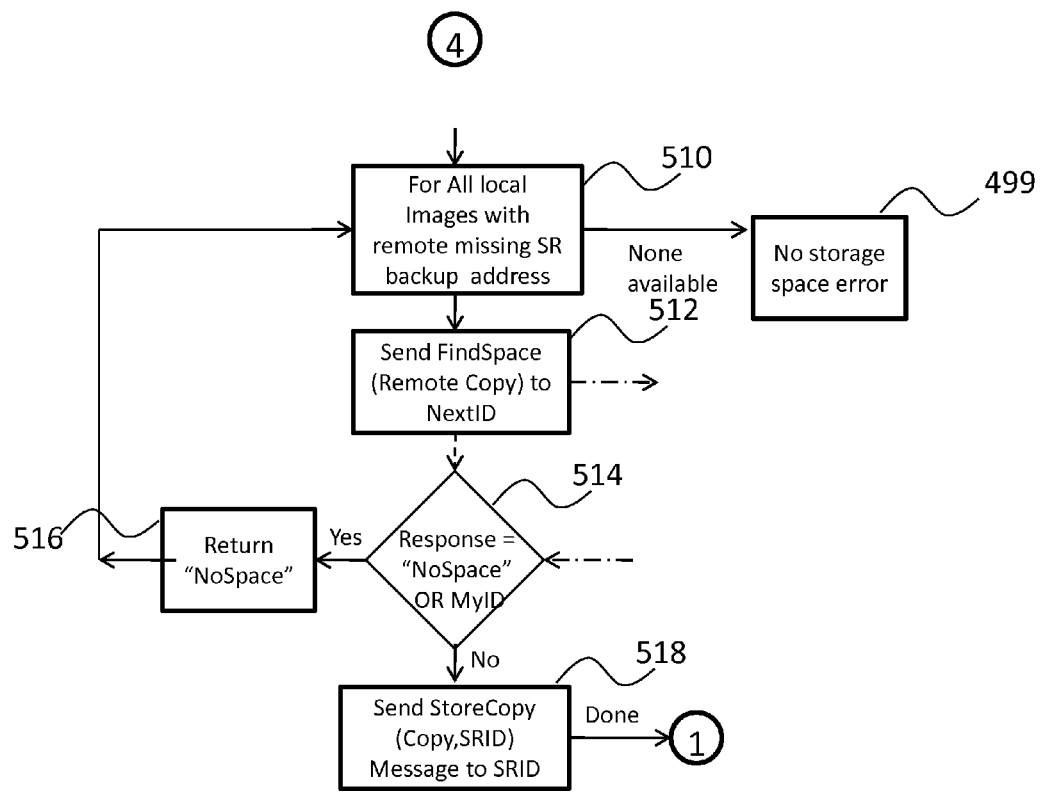

FIGS. 3 and 4 illustrate an embodiment of a software structure that can be executed by a processor 34 (FIG. 16) in the digital camera 10. FIGS. 12 and 13 illustrate an embodiment of a software structure that can be executed by the processor 34 in a storage device 12. FIG. 14 illustrates a table of information that can be stored in a storage device 12. FIGS. 5-11 illustrate software subroutines or functions that can be useful in various embodiments of elements of the present invention (digital cameras 10 and storage devices 12).

Turning to FIG. 3, a digital camera 10 of the present invention can execute software in a digital camera processor that initiates execution in (step 200). The next step is a discovery (step 202) in which the processor discovers the devices connected to a network to which the digital camera 10 is connected. Discovery protocols for both wired and wireless network-connected devices are well known in the computing and communication arts.

Once the devices on the network to which the digital camera 10 are known, the connected devices can be matched to an existing list maintained by the digital camera 10 in (step 204). If the list does not match, either a new device has been found or a device is missing and the digital camera transfers execution to (step 250) (FIG. 4). (Step 250) tests for a new device. If a device is missing, a warning is issued (step 252). If a new device has been discovered, in (step 254) the device is tested for a storage device 12 (also described herein as a storage repository and illustrated in the flow diagrams as "SR"). If the new device is not a storage device, it is ignored (step 256) as not related to the function of the digital camera 10. If it is a new storage device 12, the new device function is called (step 258) and an acknowledgement received in (step 260). If the acknowledgement is an error (e.g. the new storage device 12 is problematic for some reason), the error is reported (step 264). Otherwise, the new storage repository identification ("SRID") is added to the digital camera 10 device list in (step 268). The new device function (FIG. 11) executes to receive the new device message with a code indicating digital camera 10 information (step 460). The code is tested (step 462) and if acceptable, the code information is stored and an acknowledgement returned (step 464). If the code is not acceptable, an error acknowledgment is returned (step 466). At the end of these processes, the newly discovered device is registered with the local, digital camera device.

Once the network-connected devices are appropriately aware of each other, the digital camera 10 can await a user request in FIG. 3 (step 206, indicated with a circled 2), for example an action to store a digital image (step 208) or retrieve a digital image (step 222) with respect to a network-connected storage device 12. In the case that a user desires to store a digital image, a message to check the image space available in the storage device 10 is sent (step 210) and a response received in (step 212). The message is sent to a selected storage device 12, for example the only storage device 12 on the network, the storage device 12 with the lowest (or greatest) id value, or the one with the strongest signal. As will be seen below, the storage devices 12 intercommunicate to respond appropriately to digital camera 10 requests so that the storage devices 12 appear to a user as a single system with a single interface, even if the storage devices are geographically distributed. Hence, the digital camera 10 can communicate with any of the digital storage devices 12 in the network 14. The storage device 12 response is tested (step 214) and, if the selected storage device 12 response is that there is insufficient storage available (step 220) the user is informed of an error (step 220) and a new user request awaited (step 206). A user can then purchase another storage device 12 or delete digital images from the storage system to provide storage space for new digital images. If storage space is available, a message to that effect is received from the selected storage device (step 216) and a function called to store the digital image (step 218).

If the digital camera 10 requests a digital image retrieval (step 222), a retrieve image message is sent to the selected storage device (step 224). A response is received and tested (step 226). If the response is an error, it is reported (step 220). If the response is not an error, the digital image has been retrieved and a further user request awaited (step 206).

Turning next to FIG. 12, a storage device 12 can execute a software program on an internal processor to receive requests from digital cameras 10 and to intercommunicate over the network 14 with other storage devices 12 to which it is connected, either in a local communication network or a distributed communication network such as the internet. The storage device 12 can initially begin execution in (step 470) and perform an initial network discovery step (step 472) using known discovery protocols, similar to that undertaken by the digital camera 10 described above. Once the devices on the network 14 are discovered, the devices are matched to an internally managed list (step 474). If the list matches, the storage device 12 enters an internal wait state (indicated with a circled 1) to await an operational request (e.g. a function call requesting a service, for example from the digital camera 10 or from another storage device 12).

If the list does not match, the match is tested (step 476) to discover if it is a new device. If a new device has been discovered it is tested to discover if the new device is a storage repository (step 478). If the new device is not a storage repository, the new device is ignored (step 480) and the storage device 12 enters the wait state (circled 1). If the new device is a storage device 12, the new device function is called (step 482) and acknowledged (step 488) and the newly discovered device is registered in the local list (FIG. 11) of the storage device 10 (step 490) or an error reported.

If the match is tested (step 476) and a device is missing, the device type is tested (step 484). If it is not a storage device 12, it is ignored (step 486). If it is a missing storage device 12, the missing storage device 12 is removed from the list (step 492). However, the stored digital images of the missing storage device 12 must be recovered. Therefore, all of the local image backup copies are tested to see if the corresponding working copy was stored on the missing storage device 12 and, if so, an attempt to store the working copy is made (step 494). To do this, a message is sent to each storage device 12 on the network 14 requesting space for the working image (step 496). The response is tested (step 500) and if space is found, the image is stored (step 502) on the storage device 12 with the space. If no space is found, a "noSpace" response is returned (step 498). If no storage device 12 has space, the storage device system is out of storage and an error is generated (step 499).

Once storage for missing working copies is allocated and the reconstructed working copy stored, missing backups must also be regenerated (FIG. 13), indicated with the circled 4. All of the local image working copies are tested to see if the corresponding backup copy was stored on the missing storage device 12 and, if so, an attempt to store the backup copy is made (step 510). To do this, a message is sent to each storage device 12 on the network 14 requesting space for the backup image (step 512). The response is tested (step 514) and if space is found, the image is stored (step 518) on the storage device 12 with the space. If no space is found, a "noSpace"

response is returned (step 516). If no storage device 12 has space, the storage device system is out of storage and an error is generated (step 499).

At this point, the network devices have been discovered, new devices registered, and any missing devices noted and, if storage is missing, the missing digital images restored. The storage devices 12 await requests in a wait state (circled 1) from other storage devices 102 or from digital cameras 10.

If a request to check available storage is received (FIG. 5), the receiving storage device 12 receives the message (step 300) and makes a FindSpace function call to the referenced storage device 12 (step 302). The FindSpace function call (FIG. 8) iteratively checks the storage devices 12 on the network 14 to find one with storage space. In (step 340) the function call is received and a variable SRID value set to the local storage device id (step 342). The space is checked in another function call (step 344) that is received (step 360), local space is tested (step 362) and, if available a positive response returned (step 366) and if not a negative response returned (step 364). In (step 346), an entry in a maximum value array MaxList is set to the space response. The routine then proceeds to test all of the storage devices 12 to find the one with the most space by setting the SRID value to the next storage device id (step 348), testing to see if it is the last one in the list (the first one checked) in (step 350) and repeating the process until all of the storage devices 12 are tested and the MaxList array contains the space available in each. The Max-List array is then reviewed (step 352) to find the largest entry and the largest entry returned in (step 354).

Returning to FIG. 5, the response is tested (step 304) and, if no space is found, an error returned (step 306). If space is found, the storage device 12 with the space is recorded in SRIDa (step 308) and a second call to find storage space for the copy made (step 310). The response is tested again (step 312) and, if no space is found, an error returned (step 314). If space is found, the SRIDa value and the second response value (indicating space for the working copy and for the backup copy) are returned (step 316).

If a request to store a working copy of an image (FIG. 6), is received (step 320), the associated storage device id is tested (step 322) and, if it does not match the local storage device 12, a store image request is made to the desired storage device 12 (step 324). If it does match, the image is stored (step 326).

If a request to store a backup copy of an image (FIG. 7), is received (step 330), the associated storage device id is tested (step 332) and, if it does not match the local storage device 12, a store backup copy request is made to the desired storage device 12 (step 334). If it does match, the copy is stored (step 336).

If a request to retrieve an image (FIG. 9), is received (step 380), the processor 34 executes routines to first find the image locally and, if not found, to communicate with other network-connected storage devices 12. First, a variable is set to the local identifier (step 382) and a check for the image instituted (step 384) by a function that receives the check command (step 400) and tests the local list (step 402). If the image is locally present, it is returned (step 406) and, if not, an error is returned (step 404). The response is tested (step 386) and, if the requested image is locally present, it is returned (step 390). If it is not present, the variable is set to the next storage device id (step 388), and id check performed (step 392) and the testing process repeats by executing (step 384). If none of the storage devices 12 has the requested image, an error is returned (step 394).

Figure 10:
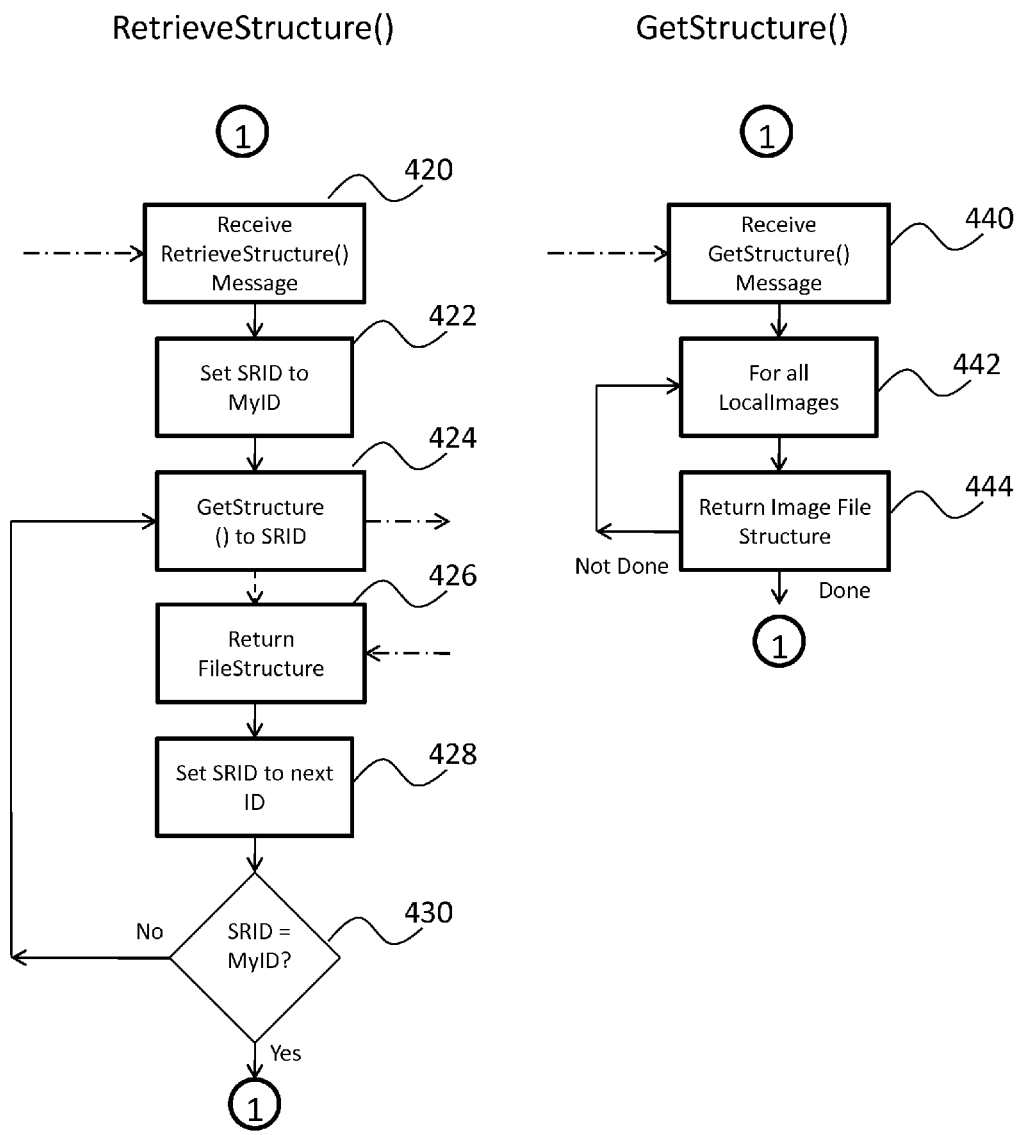
Figure 11:
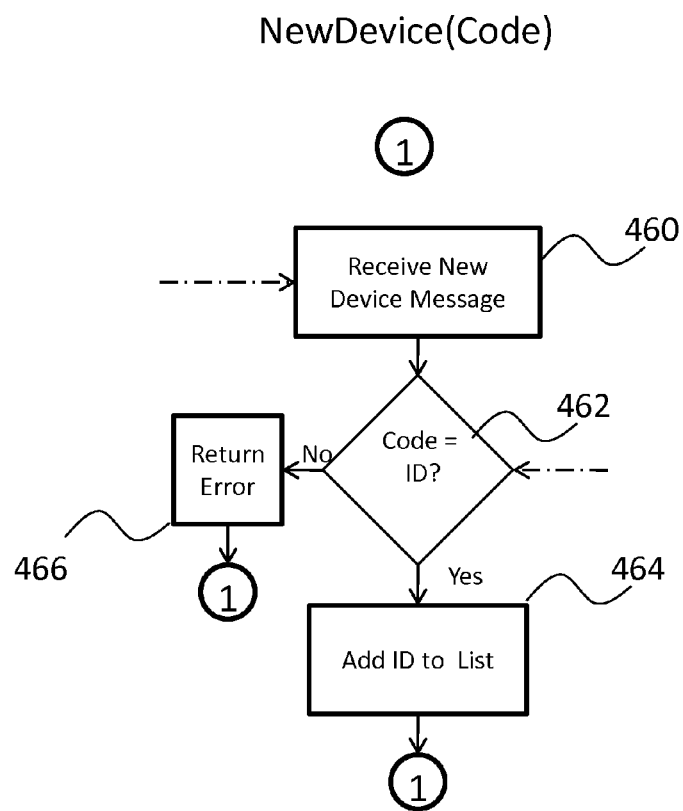

Referring to FIG. 10, processes for retrieving image information in file structures is illustrated. In (step 420) a request to retrieve a file structure is received and a variable identifier set (step 422). A structure call is sent (step 424) and received (step 440). When received, a loop testing the local file structures is performed (step 442) and, when the file structure is found, it is returned (step 444) until all are returned. The process is repeated by receiving the file structures for the identified storage device (step 426), setting the identifying variable to the next storage device 12 (step 428), testing the identifier to see if the task is completed (step 430) and continuing if not completed by returning to (step 424). Such processes can be used to update a local table of storage devices 12 and their contents.

Referring to FIG. 14, a table of storage repositories is illustrated. As shown in the figure, each storage device 12 can include a list of storage device addresses in the SR list and a list of camera device addresses in the Camera list. The local storage status is maintained with the TotalStorage of the device and the amount of used storage. The working copy images stored locally are listed, together with the file structure storing related information and the local name (or address) of the image. Likewise, remote storage device addresses for the backup copy images are listed and a list of the locally stored backup copies for remotely stored working copies is maintained.

Useful variables and constants relevant to the storage device 12, including an identifier, are also included.

The above described software and data storage structures are illustrative of one approach to implementing an embodiment of the present invention. Other approaches are also possible and can be developed using knowledge of the computing sciences and arts and are included in the present invention. For example, in one embodiment, each storage device 12 can maintain a list of the contents of other storage devices 12, or each storage device 12 does not maintain a list of all network-connected storage devices 12.

According to various embodiments of the present invention, a single logical storage structure can be separately provided for each identified user of the digital image system 5, for example for multiple users of a single digital camera 10. Alternatively, a single logical storage structure can be organized for individual digital cameras 10. In yet another alternative, a single logical storage structure is shared between multiple users or multiple digital cameras 10.

Storage memories are known in the art, as are wireless circuits and communication methods. Digital computing circuits and computers are known and software to manage the transfer and organization of digital images on one or multiple devices are known. Digital cameras are also commercially available. These tools can be used to implement various elements of the digital image system of the present invention.

The various embodiments of the present invention provide a simplified interface for digital imaging practitioners. By employing a direct, local communication interface, communication between the digital camera 10 and storage device 12 is simplified and removes the need for intermediate computers for managing the reception and storage of digital images. Indeed, once the system is set up, the user need do nothing but bring the digital camera 10 into proximity with the storage device 12 to download and store images (for a wireless local communication). Moreover, image review of stored images can be done on the digital camera display, rather than requiring a digital computer, reducing costs for users. If remote access through a computer network is desired, simple browsing devices such as net-books or tablet computers can be employed.

Furthermore, by enabling storage access through a computer network with functionally similar storage devices 12, digital images can be transferred from the digital camera 10 to the storage device 12 through a communication network 14 such as the internet without any intervention by the user. Storage can be incrementally increased one storage device 12 at a time and backup security provided as well as distributed access, without the need for centralized control or management.

Figure 18:
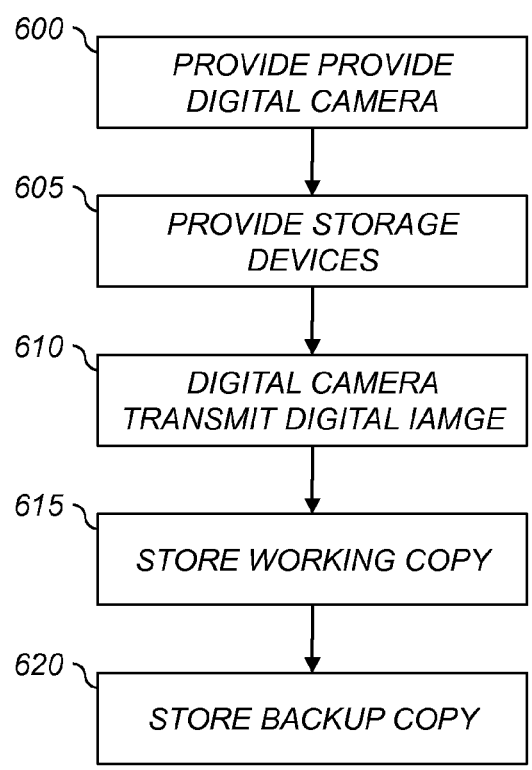
FIG. 18 illustrates a method according to an embodiment of the present invention.

Referring to FIG. 18, according to another embodiment of the present invention, a method of distributing and storing acquired images includes providing a digital camera 10 that acquires digital images and transmits digital images in (step 600). A plurality of functionally identical independent storage devices 12 are provided in (step 605), each storage device 12 receiving digital images from the digital camera 10 and storing digital images, wherein each digital image is stored as a working copy on a storage device 12 and is stored as a corresponding backup copy on a storage device 12 different from the storage device 12 storing the working copy. One or more storage devices 12 includes both a working copy of a first digital image and a backup copy of a second digital image different from the first digital image. Each storage device 12 automatically sends a working copy or backup copy to another of the plurality of storage devices 12, automatically receives a working copy or backup copy from another of the plurality of storage devices 12, and automatically stores a received working copy or backup copy.

In (step 610), the digital camera 10 transmits a digital image to a first storage device 12 and stores (in step 615) the transmitted digital image as a working copy in the first, or another, storage device 12. In (step 620), a backup copy of the working copy is stored on a storage device 12 different from the storage device 12 in which the working copy is stored. In this manner, an acquired image can be stored in a local network of storage devices 12.

Figure 19:
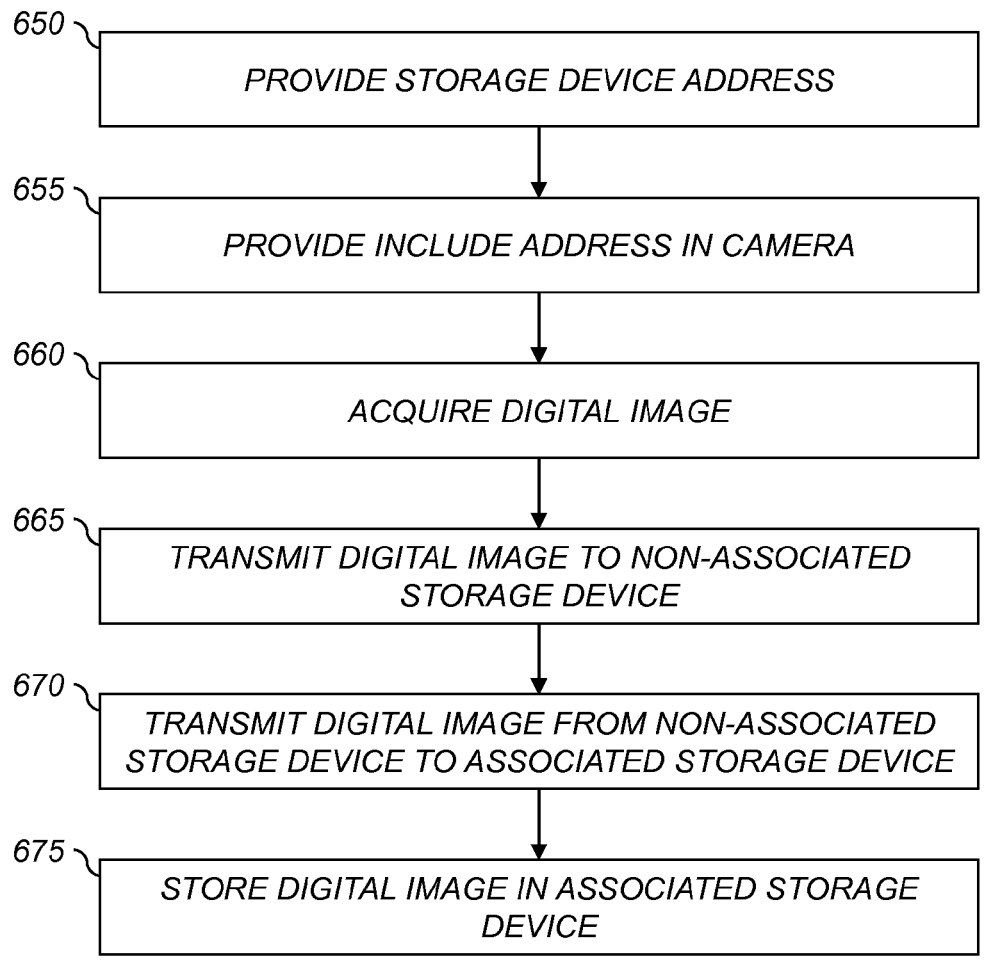
FIG. 19 illustrates another method according to an embodiment of the present invention.

Referring to FIG. 19, in an alternative embodiment of the present invention, an address is provided (step 650) for each storage device 12 and each digital camera includes the address for a storage device 12 associated with the digital camera 10 (step 655). A digital image is acquired with the digital camera 10 (step 660) and transmitted to a non-associated storage device 12 (step 665). The non-associated storage device 12 transmits the digital image through a communication network (not shown) to the storage device 12 associated with the digital camera 10 (step 670) and the digital image is stored in the storage device 12 associated with the digital camera 10 (step 675). In this manner, an acquired image can be transferred to a storage device 12 remote from a user's storage devices and stored in a user's associated storage device 12 or a network of such storage devices 12 connected to the associated storage device 12. In this context, an associated storage device 12 can be a group of storage devices 12 forming a single repository, as described above.

In other methods of the present invention, the storage devices 12 form a single logical repository for a user, or multiple logical storage repositories for multiple users. An odd number of storage devices 12 (such as three) can be provided, and the storage devices 12 can be provided on the network 14 and independently accessed through the network 14. Storage devices 12 can have unique combinations of working and backup copies of digital images. Backup copies can be provided in a compressed format that takes less space than working copies, but are slower to access. Storage devices 12 can be provided in groups that have one or members in common. Each group can be independently accessible.

Figure 15:
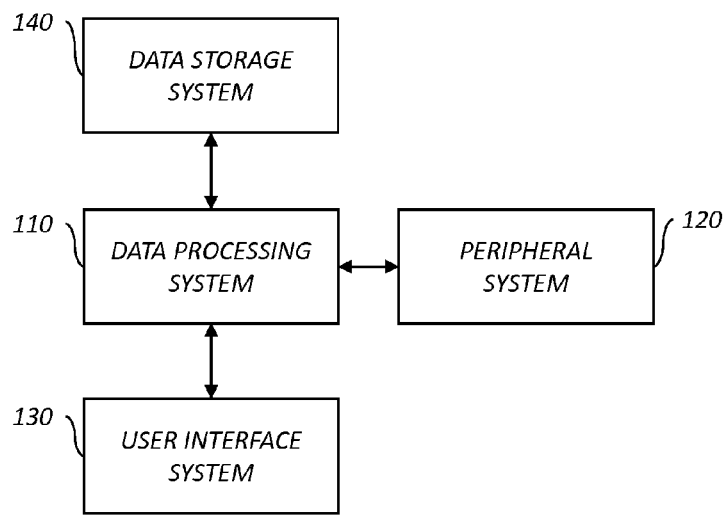
FIG. 15 is schematic illustration of a digital image system useful for the present invention.
Figure 16:
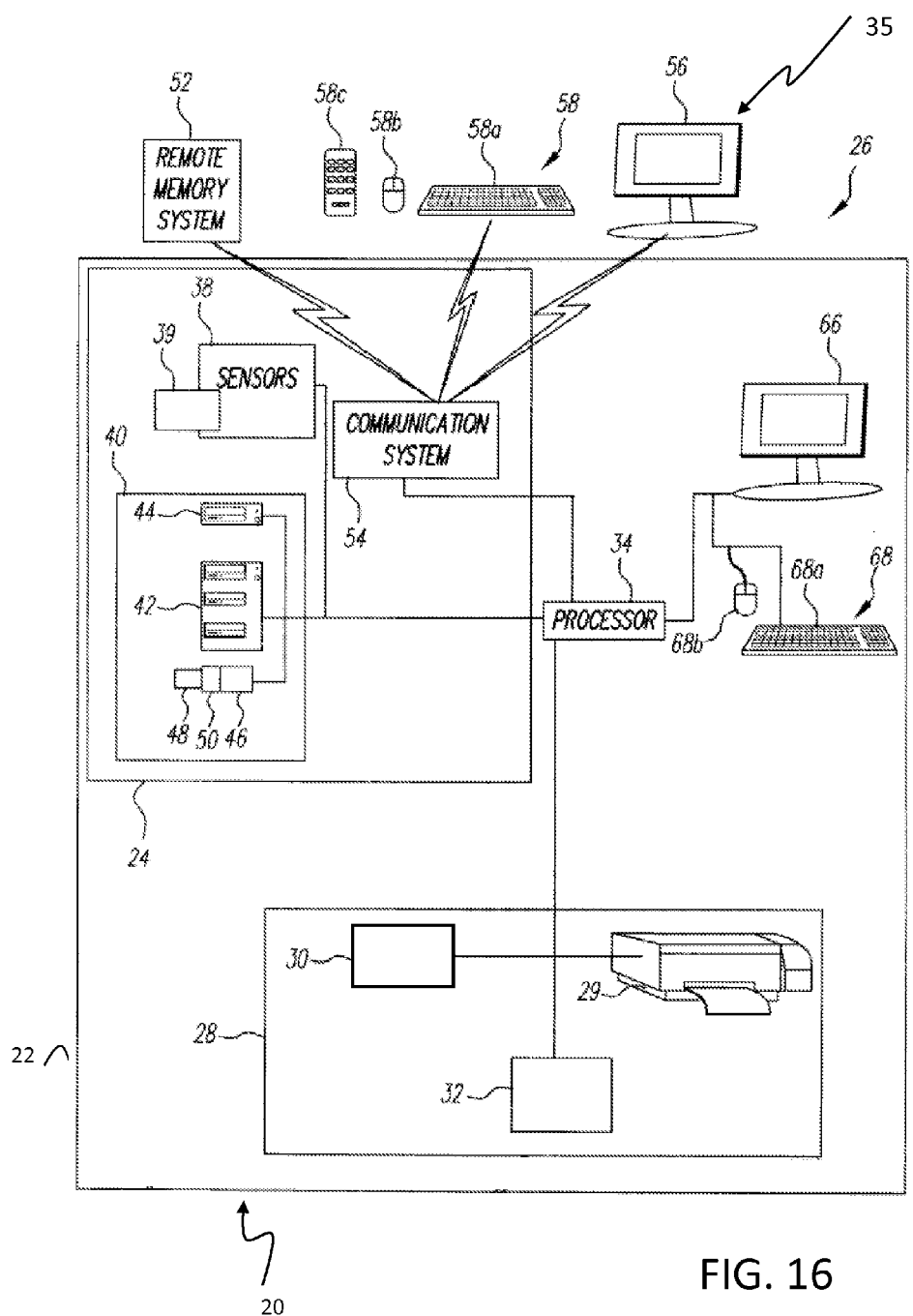
FIG. 16 is a more detailed schematic of a digital image system useful for the present invention.
Figure 17:
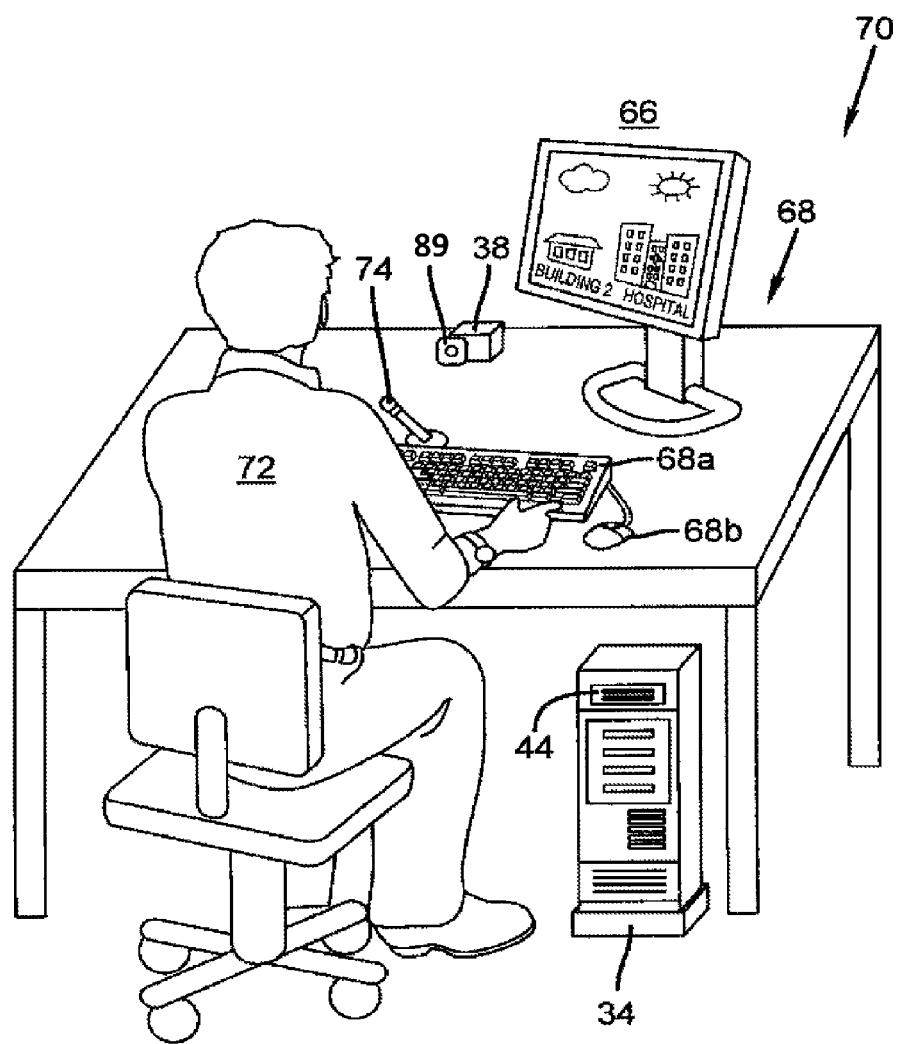
FIG. 17 illustrates a computer system useful for the present invention.

FIGS. 15, 16, and 17 illustrate computing systems having a variety of elements. Some or all of these elements can be used to implement, access, or support various portions of the present invention, for example as storage devices 12, digital cameras 10, computer docks, or computers useful for the present invention.

FIG. 15 is a high-level diagram showing the components of a system useful for making, reading, using, and writing digital images according to various embodiments of the present invention, for example in a storage device 12 or a camera device 10. The system includes a data processing system 110, a peripheral system 120, a user interface system 130, and a data storage system 140. The peripheral system 120, the user interface system 130 and the data storage system 140 are communicatively connected to the data processing system 110. A user interface system 130 is not necessarily present for devices such as storage device 12.

The data processing system 110 includes one or more data processing devices that implement the processes of the various embodiments of the present invention, including the example processes described herein. The phrases "data processing device" or "data processor" are intended to include any data-processing device, such as a central processing unit ("CPU"), a desktop computer, a laptop computer, a mainframe computer, a personal digital assistant, a Blackberry™, a digital camera, a digital picture frame, cellular phone, a smart phone, an electronic digital data storage system or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user-interface system 130 are shown separately from the data-processing system 110, one skilled in the art will appreciate that one or both of such systems can be stored completely or partially within the data processing system 110.

The peripheral system 120 can include one or more devices configured to provide digital content records to the data-processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 15.

As shown in FIG. 16 in more detail, a computer system for efficiently making, reading, using, and writing digital images according to various embodiments of the present invention includes an electronic computer system 20, for example a computer server, connected to a remote electronic computer system 35, for example a remote client computer, through a computer network, the electronic computer system 20 including memory 40 for storing one or more digital images communicated through the computer network to the remote electronic computer system 35, the remote electronic computer system 35 having a display 66 for displaying the digital images in a graphic user interface.

In the embodiment of FIG. 16, the electronic computer system 20 includes the source of content data files 24, a user input system 26 and an output system 28 connected to the processor 34. The source of content data files 24, user-input system 26 or output system 28 and processor 34 can be positioned within a housing 22 as illustrated. In other embodiments, circuits and systems of the source of content data files 24, user input system 26 or output system 28 can be positioned in whole or in part outside of housing 22.

The source of content data files 24 can include any form of electronic or other circuit or system that can supply digital data to processor 34 from which processor 34 can derive images for use in forming a digital image file. In this regard, the source of content data files 24 can include, for example and without limitation, still images, image sequences, video graphics, and computer-generated images. Source of content data files 24 can optionally capture images to create content data for use in content data files by use of capture devices located at, or connected to, electronic computer system 20 or can obtain content data files 24 that have been prepared by or using other devices such as the remote electronic computer system 35. In the embodiment of FIG. 16, source of content data files 24 includes sensors 38, the memory 40 and a communication system 54.

Sensors 38 are optional and can include light sensors, biometric sensors and other sensors known in the art that can be used to detect conditions in the environment of electronic computer system 20 and to convert this information into a form that can be used by processor 34 of electronic computer system 20. Sensors 38 can also include one or more image sensors 39 that are adapted to capture still or video images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within electronic computer system 20 or it can be removable. In the embodiment of FIG. 16, electronic computer system 20 is shown having a hard drive 42, disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as the remote electronic computer system 35, a personal computer, computer network or other digital system. Remote memory system 52 can also include solid-state, magnetic, optical or other data-storage devices.

In the embodiment shown in FIG. 16, electronic computer system 20 has a communication system 54 that in this embodiment can be used to communicate with remote electronic computer systems 35 for example including an optional remote memory system 52, an optional remote display 56, or optional remote input 58 (also referred to herein as "remote input 58"). The optional remote memory system 52, optional remote display 56, and optional remote input 58 can all be part of the remote electronic computer system 35 having a remote input 58 with remote input controls, and that can communicate with communication system 54 wirelessly as illustrated or can communicate in a wired fashion. In an alternative embodiment, a local input station including either or both of the local display 66 and local input controls 68 (also referred to herein as "local user input 68") can be connected to communication system 54 using a wired or wireless connection.

Communication system 54 can include for example, one or more optical, radio frequency or other transducer circuits or other systems that convert image and other data into a form that can be conveyed to a remote device such as the remote memory system 52 or the remote display 56 using an optical signal, radio frequency signal or other form of signal. Communication system 54 can also be used to receive a digital image and other data from a host or server computer or network (not shown), the remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the electronic computer system 20 can provide web access services to remote electronic computer systems 35 that access the electronic computer system 20 through a web browser. Alternatively, the remote electronic computer system 35 can provide web services to electronic computer system 20 depending on the configurations of the systems.

User input system 26 provides a way for a user 72 of electronic computer system 20 to provide instructions to processor 34. This permits the user 72 to make a designation of content data files 24 to be used in generating a digital image file and to select an output form for an output product or print. User input system 26 can also be used for a variety of other purposes including, but not limited to, permitting the user 72 to arrange, organize and edit content data files 24 to be incorporated into the image-enhanced output product, to provide information about the user or audience, to provide annotation data such as voice and text data, to identify characters in the content data files, and to perform such other interactions with electronic computer system 20 as are described herein.

In this regard user-input system 26 can include any form of transducer or other device capable of receiving an input from the user 72 and converting this input into a form that can be used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 16, user input system 26 includes an optional remote input 58 including a remote keyboard 58a, a remote mouse 58b, and a remote control 58c and a local user input 68 including a local keyboard 68a and a local mouse 68b.

Remote input 58 can take a variety of forms, including, but not limited to, the remote keyboard 58a, remote mouse 58b or remote control handheld device 58c illustrated in FIG. 16. Similarly, local user input 68 can take a variety of forms. In the embodiment of FIG. 16, local display 66 and local user input 68 are shown directly connected to processor 34.

As is illustrated in FIG. 17 local user input 68 can take the form of an editing area 70 such as a home computer, an editing studio, or kiosk that can also be the remote electronic computer system 35. In this illustration, the user 72 is seated before a console including local keyboard 68a and mouse 68b and a local display 66 which is capable, for example, of displaying multimedia content, for example in a graphic user interface. As is also illustrated in FIG. 17, editing area 70 can also have sensors 38 including, but not limited to, image sensors 89, audio sensors 74 and other sensors such as multispectral sensors that can monitor user 72 during a production session or provide other information such as images.

Output system 28 (FIG. 16) is used for rendering images, text or other graphical representations in a manner that permits printing image, text, or other graphical representations. In this regard, output system 28 can include any conventional structure or system that is known for printing or recording images on output device 32 including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. It will be appreciated that this is not necessary and that the claimed methods and apparatuses herein can be practiced with the printer 29 that prints monotone images such as black and white, grayscale, or sepia-toned images. As will be readily understood by those skilled in the art, the electronic computer system 20 can be separated from the remote electronic computer system 35 connected to the printer 29.

In certain embodiments, the source of content data files 24, user input system 26 and output system 28 can share components.

Processor 34 operates electronic computer system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

The invention has been described in detail with particular reference to certain preferred embodiments thereof, but it will be understood that variations and modifications can be effected within the spirit and scope of the invention.

PARTS LIST 5 distributed image acquisition, storage, and backup system
10 digital camera
11 camera identifier
12 storage device
13 storage device identifier
14 network
15 wireless network/communication channel connection
16 wired network/communication channel connection
20 electronic computer system
22 housing
24 source of content data files
26 user input system
28 output system
29 printer
30 tangible surface
32 output device
34 processor
35 remote electronic computer system
38 sensors
39 image sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 editing area (home computer, editing studio, or kiosk)
72 user
74 audio sensors
89 image sensors
110 data processing system
120 peripheral system
130 user interface system
140 data storage system
200 camera start step
202 discover network step
204 match local list step
206 receive user request step
208 user request test step
210 call CheckImageSpace step
212 return CheckImageSpace step
214 SRId test step
216 call StoreImage step 218 call StoreCopy step
220 inform user error step
222 user request test step
224 call RetrieveImage step
226 image test step
250 new device step
252 inform user device missing step
254 new device test step
256 ignore step
258 send new device step
260 receive acknowledgement message step
262 acknowledge test step
264 inform user device error step
268 add SRID to SR list step 300 receive CheckImageSpace message step
302 call FindSpace step
304 response test step
306 return step
308 SRID assignment step
310 call FindSpace step
312 rest response step
314 return step
316 return step
320 receive StoreImage step
322 test SRID step
324 call StoreImage step
326 store image step
330 receive storecopy step
332 test SRID step
334 call StoreCopy step
336 store copy step
340 receive FindSapce step
342 set SRID step
344 call checkSpace step
346 MaxList assignment step
348 set SRID step
350 test SRID step
352 find Max space step
354 return SRID step
360 receive CheckSpace step
362 test Space step
364 return MyID step
366 return MyID space step
380 receive RetrieveImage step
382 set SRID step
384 send CheckImage step
386 test Response step
388 set SRID step
390 return Image step
392 test SRID step
394 return step
400 receive CheckImage step
402 image test step
404 return step
406 return step
420 receive RetrieveStructure step
422 set SRID step
424 call GetStructure step
426 return FileStructure step
428 set SRID step
430 test SRID step
440 receive GetStructure step
442 loop step
444 return image File Structure step
460 receive New Device Message step
462 code test step
464 add camera step
466 return step
470 start step
472 discover network step
474 match SR test step
476 new device test step
478 new device=SR test step
480 ignore step
482 call NewDevice step
484 test missing SR device step
486 ignore step
488 receive acknowledge step
490 SRID added or error reported step
492 remove SR from list step
494 loop step
496 call FindSpace step
498 return step
499 return no storage space error step
500 response test step
502 call StoreImage step
510 loop step
512 call FindSpace step
514 response test step
516 return step
518 call Storecopy step
600 provide digital camera step
605 provide storage devices step
610 digital camera transmit digital image step
615 store working copy step
620 store backup copy step
650 provide storage device address step
655 provide include address in camera step
660 acquire digital image step
665 transmit digital image to non-associated storage device step
670 transmit digital image from non-associated storage device to associated storage device step
675 store digital image in associated storage device step

The invention claimed is:

1. A system comprising:
a plurality of storage devices, wherein an image capture device is configured to acquire digital images and to transmit the digital images to one or more of the plurality of storage devices, and wherein each storage device of the plurality of storage devices is configured to receive and to store the digital images from the image capture device, wherein each of the digital images is stored as a working copy on a first storage device of the plurality of storage devices and is stored as a corresponding backup copy on a second storage device of the plurality of storage devices different from the first storage device, wherein the first storage device is further configured to store both a first working copy of a first digital image and a first backup copy of a second digital image different from the first digital image, wherein at least one of the plurality of storage devices is configured to store a list, and wherein the list contains information relating to the plurality of storage devices and contents of the plurality of storage devices;
wherein each storage device is further configured to, based at least in part on the list, automatically send a stored working copy or a stored backup copy of one of the digital images to another of the plurality of storage devices, automatically receive a sent working copy or a sent backup copy of one of the digital images from another of the plurality of storage devices, and automatically store a received working copy or a received backup copy of one of the digital images;

wherein each storage device of the plurality of storage devices is interoperable with other storage devices of the plurality of storage devices and the image capture device without the use of a central controlling device or a central communication interface; and wherein each storage device of the plurality of storage devices is on a common network and is configured to store information about working or backup copies stored on other storage devices on the common network.

2. The system of claim 1, wherein one or more of the plurality of storage devices form a single, logical storage repository.

3. The system of claim 1, wherein the plurality of storage devices comprises an odd number of storage devices.

4. The system of claim 1, further comprising a network connected to the plurality of storage devices, and a mechanism configured to provide independent access to each of the plurality of storage devices through the network.

5. The system of claim 1, wherein the image capture device is further configured to request and receive a working copy from the plurality of storage devices, and wherein at least one of the plurality of storage devices is configured to:
   determine an absence of the requested working copy in a storage device of the plurality of storage devices,
   request the requested working copy from another storage device of the plurality of storage devices,
   receive the requested working copy from the another storage device, and
   transmit the requested working copy to the image capture device.

6. The system of claim 1, wherein at least one storage device of the plurality of storage devices is configured to store a unique combination of working and backup copies.

7. The system of claim 1, wherein the first storage device is configured to store the working copy in a different format from the corresponding backup copy.

8. The system of claim 7, wherein the working copy is accessible faster than the corresponding backup copy.

9. The system of claim 1, further comprising a mechanism configured to reconstitute and store, on one or more of the plurality of storage devices, stored contents of a damaged storage device.

10. The system of claim 1, wherein the common network comprises a common local network.

11. The system of claim 1, wherein the common network comprises a common local network, and wherein each storage device of the plurality of storage devices does not include information about all other storage devices on the common local network or does not include information about all other working or backup copies stored on the other storage devices on the common local network.

12. The system of claim 1, wherein the storage devices of the plurality of storage devices are grouped into two or more storage groups, and wherein the storage devices in each storage group form a single, logical storage repository separate from a single logical storage repository of any other storage group.

13. The system of claim 12, wherein at least one storage device of the plurality of storage devices is a member of two or more storage groups.

14. The system of claim 1, wherein a storage device of the plurality of storage devices is configured to transfer a working copy or backup copy from itself to another storage device, and wherein the other storage device is configured to receive and store the transferred working copy or backup copy.

15. The system of claim 1, wherein a storage device of the plurality of storage devices is configured to make a working copy from a backup copy on itself; and to transfer the made working copy to another storage device that is configured to receive and store the made working copy.

16. The system of claim 1, wherein a storage device of the plurality of storage devices is configured to make a backup copy from a working copy on itself; and to transfer the made backup copy to another storage device that is configured to receive and store the made backup copy.

17. The system of claim 1, wherein a backup copy is made in a storage device of the plurality of storage devices in which the backup copy is stored.

18. The system of claim 1, wherein the image capture device is configured to physically connect to a storage device of the plurality of storage devices to transmit digital images from the image capture device to the storage device.

19. A system comprising:
    a plurality of storage devices, wherein each storage device of the plurality of storage devices is configured to receive and to store digital images from an image capture device, wherein each of the digital images is stored as a working copy on a first storage device of the plurality of storage devices and is stored as a corresponding backup copy on a second storage device of the plurality of storage devices different from the first storage device, wherein the first storage device is further configured to store both a first working copy of a first digital image and a first backup copy of a second digital image different from the first digital image, wherein at least one of the plurality of storage devices is configured to store a list, and wherein the list contains information relating to the plurality of storage devices and contents of the plurality of storage devices;
    wherein each storage device is further configured to, based at least in part on the list, automatically send a stored working copy or a stored backup copy of one of the digital images to another of the plurality of storage devices, automatically receive a sent working copy or a sent backup copy of one of the digital images from another of the plurality of storage devices, and automatically store a received working copy or a received backup copy of one of the digital images;
    wherein each storage device of the plurality of storage devices is interoperable with other storage devices of the plurality of storage devices and the image capture device without the use of a central controlling device or a central communication interface; and
    wherein each storage device of the plurality of storage devices is on a common network and is configured to store information about working or backup copies stored on other storage devices on the common network.

20. A method comprising:
    receiving and storing digital images from an image capture device on each of a plurality of storage devices, wherein each of the digital images is stored as a working copy on a first storage device of the plurality of storage devices and is stored as a corresponding backup copy on a second storage device of the plurality of storage devices different from the first storage device, wherein the first storage device is further configured to store both a first working copy of a first digital image and a first backup copy of a second digital image different from the first digital image, wherein at least one of the plurality of storage devices is configured to store a list, and wherein the list contains information relating to the plurality of storage devices and contents of the plurality of storage devices;

automatically sending, from each of the plurality of storage devices and based at least in part on the list, a stored working copy or a stored backup copy of one of the digital images to another of the plurality of storage devices;

automatically receiving, from each of the plurality of storage devices, a sent working copy or a sent backup copy of one of the digital images from another of the plurality of storage devices; and automatically storing, on each of the plurality of storage devices, a received working copy or a received backup copy of one of the digital images;

wherein the receiving and storing digital images, the automatically sending, the automatically receiving, and the automatically storing are performed without use of a central controlling device or a central communication interface; and wherein each storage device of the plurality of storage devices is on a common network and is configured to store information about working or backup copies stored on other storage devices on the common network.

21. The system of claim 4, wherein the independent access is provided based on a security policy that comprises a storage identifier related to the image capture device.

22. The system of claim 5, wherein the absence of the requested working copy is determined using the list.

23. The system of claim 1, wherein each of the plurality of storage devices are configured to store the list.

24. The system of claim 1, wherein at least one of the plurality of storage devices is configured to maintain the list, wherein maintaining the list comprises updating the list based on a presence or absence of the plurality of storage devices and a presence or absence of contents of the plurality of storage devices.

25. The system of claim 1, wherein the image capture device or one of the plurality of storage devices comprises a requesting mechanism configured to request a working copy from another storage device of the plurality of storage devices, and wherein the other storage device comprises a retrieval and transmission mechanism configured to retrieve and transmit the requested working copy to the image capture device or to the one of the plurality of storage devices.

26. The system of claim 7, wherein the corresponding backup copy is more compressed than the working copy.

* * * * *